(12) United States Patent
Suzuki

(10) Patent No.: US 6,409,216 B2
(45) Date of Patent: Jun. 25, 2002

(54) SUSPENSION FRAME CONSTRUCTION

(75) Inventor: Tomoyuki Suzuki, Hamamatsu (JP)

(73) Assignee: Suzuki Motor Corporation, Shizuoka-ken (JP)

( * ) Notice: Subject to any disclaimer, the term of this patent is extended or adjusted under 35 U.S.C. 154(b) by 0 days.

(21) Appl. No.: 09/801,995

(22) Filed: Mar. 8, 2001

(30) Foreign Application Priority Data

Mar. 17, 2000 (JP) ........................................ 2000-075088
Apr. 12, 2000 (JP) ........................................ 2000-110141

(51) Int. Cl.$^7$ ............................................... B62D 21/00
(52) U.S. Cl. ................. 280/781; 280/785; 280/124.109
(58) Field of Search ................................ 280/781, 785, 280/786, 787, 788, 784, 124.109; 296/194, 204, 203.02; 180/311, 312

(56) References Cited

U.S. PATENT DOCUMENTS 5,573,274 A * 11/1996 Koketsu ..................... 180/297
6,170,906 B1 * 1/2001 Kasuga ....................... 296/194

FOREIGN PATENT DOCUMENTS

JP          7-179180 A         7/1995

* cited by examiner

Primary Examiner—Brian L. Johnson
Assistant Examiner—Faye M. Fleming
(74) Attorney, Agent, or Firm—Alston & Bird LLP

(57) ABSTRACT

There is provided a suspension frame construction capable of increasing rigidity when a braking load, a lateral load, or an engine mounting load is applied to a suspension frame. In a suspension frame construction comprising an upper plate and a lower plate joined to each other to form a suspension frame; and front- and rear-side suspension arm support portions provided at both ends, right and left, of the suspension frame, the lower plate 9 is made up of a pair of side plates $11_1$ and $11_2$ each provided with a support portion for supporting at least a rear-side arm of a suspension arm $10_1$, $10_2$ and a center plate 12 for connecting the side plates $11_1$ and $11_2$ to each other.

13 Claims, 18 Drawing Sheets

SUSPENSION FRAME CONSTRUCTION

FIELD OF THE INVENTION AND RELATED ART STATEMENT

The present invention relates to a suspension frame construction for supporting a suspension lower arm, an engine mounting member, and the like.

Generally, the vehicle body constructions of motor vehicles are broadly divided into a framed construction used for motor trucks and the like and a frameless construction used for passenger cars and the like. The frameless construction incorporates side members and cross members as a part of body in place of a frame to increase the torsional rigidity. A chassis part is usually attached directly to the body, but, on some vehicles, it is attached to a partial frame, what is called a subframe, and then is assembled to the body.

The subframe is also referred to as a suspension frame because suspension lower arms are usually attached to both sides of the subframe. Hereafter, the subframe and the like are given a general name of a suspension frame.

The suspension frame is assembled to the vehicle body as an assembled part after a suspension lower frame, a stabilizer, and the like are attached thereto. The suspension frame is generally composed of an upper plate, a lower plate, and lower arm mounting brackets as a basic construction.

FIGS. 21 to 28 show a construction of a conventional suspension frame (Japanese Patent Provisional Publication No. 7-179180).

A suspension frame 100 is supported on a pair of side members 101, 101 at both sides thereof, and suspension lower arms 102, 102 are attached to both sides of the suspension frame 100. Between the suspension frame 100 and a cross member 103 installed on the front is provided a center member 104, to which an engine 105 is assembled.

The suspension frame 100 is usually disposed at the lower part of an engine room isolated by a dash panel 106, and is fitted with various fittings. The dash panel 106 is fitted with a steering knuckle 107 via brackets 108.

As shown in FIGS. 24 to 26, the suspension frame 100 is formed by joining an upper plate 109 and a lower plate 110, which are formed by pressing a steel plate etc., by welding or other means, and at both sides, right and left, of the suspension frame 100 are provided vehicle body mounting portions h, i and j, and in the central portion thereof are provided engine mounting member mounting portions k. At both sides in the vehicle width direction of the suspension frame 100, a pair of suspension lower arm mounting portions 100a and 100d are provided. In the suspension lower arm mounting portion 100a on the front side of the vehicle body is provided a lower arm mounting bracket 111 in a cantilever state.

The lower arm mounting bracket 111 is formed into a substantially square box shape with one side being open by pressing or other means, and the opposed wall faces 111a and 111b thereof are provided with pivotally supporting portions 112, 112 for the suspension lower arms 102, 102. This lower arm mounting bracket 111, which is supported on the outside of the vehicle body mounting portions h, i and j in a cantilever manner, has a construction that provides low rigidity and is disadvantageous in terms of driving stability and vibration noise.

To mount the lower arm mounting bracket 111, as shown in FIG. 26, a distal end portion 109a of the upper plate 109 is lapped partially on and joined to the upper face of the lower arm mounting bracket 111. Also, the distal end of the lower plate 110 is butt-welded to the wall face of the lower arm mounting bracket 111. Therefore, a reinforcement 113 is installed between the upper plate 109 and the lower plate 110 to reinforce the mounting portion of the lower arm mounting bracket 111. Further, a flange portion 114 is provided along the open end portion of the lower arm mounting bracket 111 to increase the rigidity of the bracket 111.

The suspension frame 100 is subjected to the severest condition when a longitudinal load is applied thereto (for an actual vehicle, for example, when the brake is applied or when a wheel falls into a pothole).

When a braking load is applied to the suspension frame 100, as shown in FIG. 27, the mounting portion 100a of the lower arm mounting bracket 111 is put into a deformation mode of being opened to the outside while being twisted as indicated by the arrow ①, and a central portion 100b of the suspension frame 100 is put into a deformation mode of being sunk as indicated by the broken line ②.

The central portion 100b of the suspension frame 100 is also sunk in the same manner by a load applied by the engine mounting member at the time of sudden start.

On the other hand, as shown in FIG. 28, when a load is applied in the lateral direction, the mounting portion 100a of the lower arm mounting bracket 111 is twisted to the inside as indicated by the arrow ③. As a result, one of the lower arm mounting portions 100d on the vehicle body rear side of the suspension frame 100 is deformed upward as indicated by the arrow ④ and the other thereof is deformed downward as indicated by the arrow ⑤. Also, on both sides of the central portion 100b of the suspension frame 100, one side is deformed upward as indicated by the arrow ④ and the other side is deformed downward as indicated by the arrow ⑤. Thus, the suspension frame 100 is put into a deformation mode of being wavy.

As is apparent from the above-described deformation modes, the rigidity around the opening portion of the lower arm mounting bracket 111 is low in the case where the suspension frame 100 is formed merely by two upper and lower plates joined to each other. Near the opening portion, the vehicle body mounting portions lie. If the rigidity of this portion of the suspension frame 100 is low, therefore, there is a possibility that the first-order natural frequency of the suspension frame 100 resonates with the vehicle body.

OBJECT AND SUMMARY OF THE INVENTION

The present invention has been made to solve the above problems, and accordingly an object thereof is to provide a suspension frame construction capable of increasing rigidity when a braking load, a lateral load, or an engine mounting load is applied to a suspension frame.

To solve the above problems, the present invention provides a suspension frame construction comprising an upper plate and a lower plate joined to each other to form a suspension frame; and front- and rear-side suspension arm support portions provided at both ends, right and left, of the suspension frame, wherein the lower plate is made up of a pair of side plates each provided with a support portion for supporting at least a rear-side arm of a suspension arm and a center plate for connecting the side plates to each other.

Also, the present invention is characterized in that the thicknesses of the side plates are made greater than the thickness of the center plate, and a vehicle body mounting portion is provided on the side plate.

Further, the present invention is characterized in that the suspension arm support portions are provided on the front and rear of the right and left side plates, and a side wall portion is formed on the outside of the side plate.

Still further, the present invention is characterized in that bent portions are formed at both ends of the center plate to form a gap between the center plate and the right and left side plates, and the distal lower end of the bent portion is joined to the side plate to form a vertical wall portion for partitioning the interior of the suspension frame.

Also, the present invention is characterized in that the vertical wall portion is arranged in a substantially straight line with respect to the side wall portion.

Further, the present invention is characterized in that the side wall portion provided on the side plate is formed so as to be close to the vehicle body mounting portion of the suspension frame.

Still further, the present invention is characterized in that both end portions of the center plate are lapped partially on the right and left side plates, the lapped portion is inclined toward the vertical wall portion, and a gap is formed in the lapped portion.

Also, the present invention is characterized in that the inclined portion of the center plate is extended to at least the vehicle body mounting portion of the suspension frame.

The present invention provides a suspension frame construction comprising an upper plate and a lower plate joined to each other to form a suspension frame; and front-and rear-side suspension arm support portions provided at both ends, right and left, of the suspension frame, wherein the upper plate is made up of a pair of side plates each provided with a support portion for supporting at least a rear-side arm of a suspension arm and a center plate for connecting the side plates to each other.

Also, the present invention provides a suspension frame construction comprising an upper plate and a lower plate joined to each other to form a suspension frame; and suspension arm support portions extending to the substantially front and lateral sides, which are provided at both ends, right and left, of the suspension frame, wherein the upper plate is made up of a pair of side plates each provided with a support portion for supporting at least a rear-side arm of a suspension arm and a center plate for connecting the side plates to each other, an outer wall portion is formed in the suspension arm support portion extending to the substantially front side, and a vertical wall portion continuous with the outer wall portion is provided on the center plate.

Further, the present invention is characterized in that the center plate comprises inclined portions provided on the inside of the right and left vertical wall portions, an intermediate portion connected to the lower plate, which is provided between the inclined portions, and lapped portions joined face-to-face to the lower plate, which are each provided between the vertical wall portion and the inclined portion.

Still further, the present invention is characterized in that the peripheral edge of the side plate is joined to the lower plate, and the lower face of the side plate is joined to the upper end of inclined portion and the upper end of vertical wall portion of the center plate.

Also, the present invention is characterized in that the lapped portions of the center plate are joined to the lower plate by penetration welding.

DETAILED DESCRIPTION OF PREFERRED EMBODIMENT

Embodiments of the present invention will now be described in detail with reference to the accompanying drawings.

Figure 1:
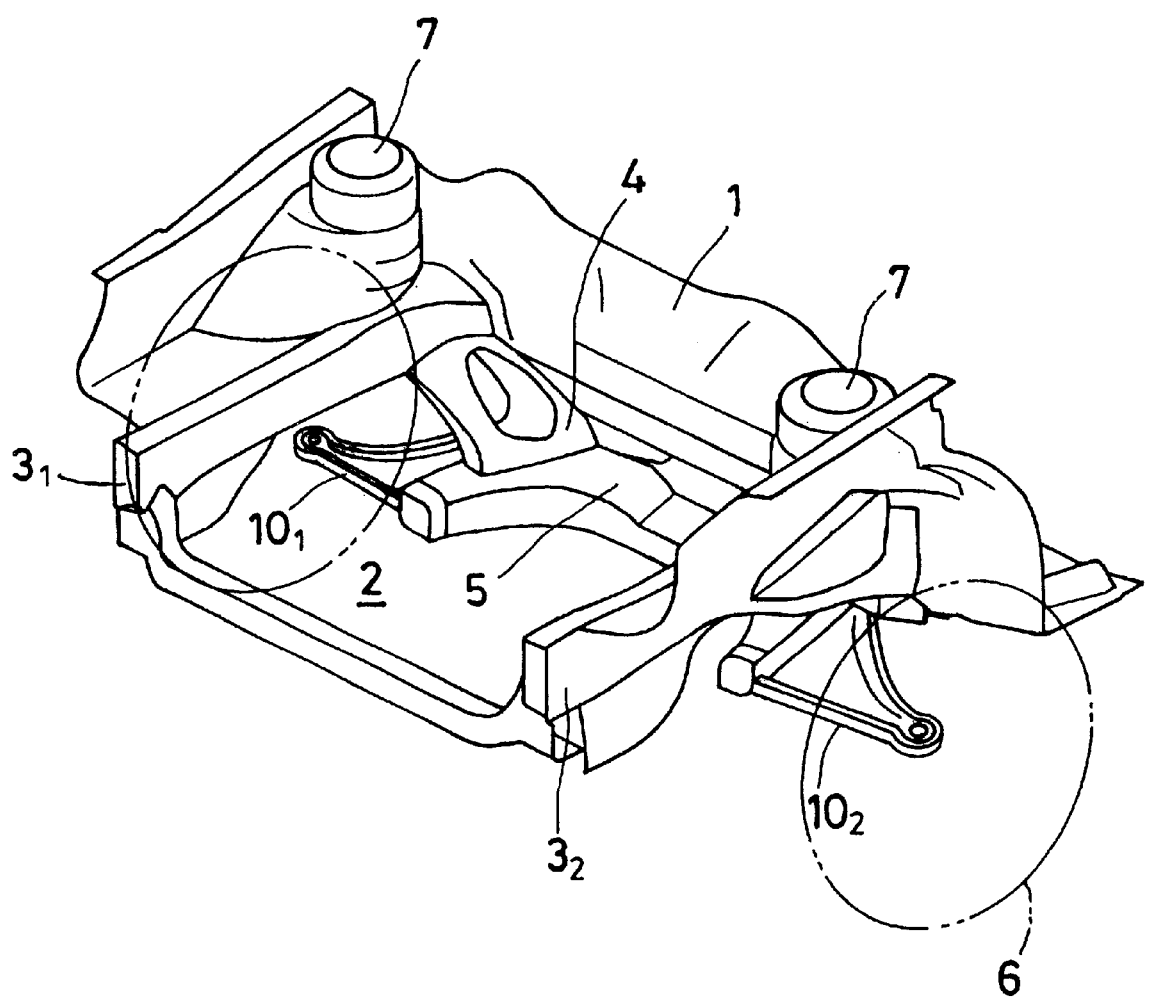
FIG. 1 is a schematic perspective view showing an embodiment of a suspension frame construction in accordance with the present invention.

FIG. 1 shows the vehicle body front part of a motor vehicle.

In an engine room 2 isolated by a dash panel 1, a suspension frame 5 is installed to front side members $3_1$ and $3_2$, which are disposed on both sides of a vehicle body, via brackets 4 on the lower face side of the engine room 2. On the outside of the front side members $3_1$ and $3_2$ are provided struts 7 for suspending right and left wheels 6.

The construction of the suspension frame 5 will be described with reference to FIGS. 2 to 9.

As shown in FIGS. 2 to 6, the suspension frame 5 is formed into a substantially closed curved surface construction by joining an upper plate 8 and a lower plate 9', which are formed by pressing, to each other by welding or other means.

Figure 2:
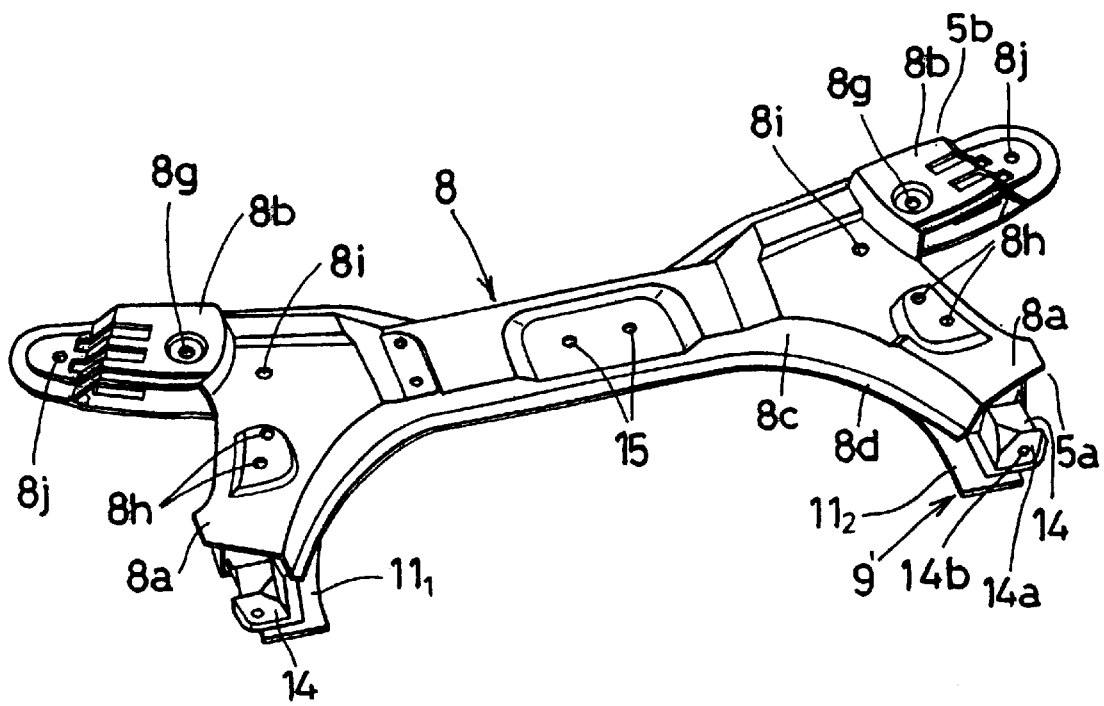
FIG. 2 is a perspective view of the suspension frame construction shown in FIG. 1.
Figure 3:
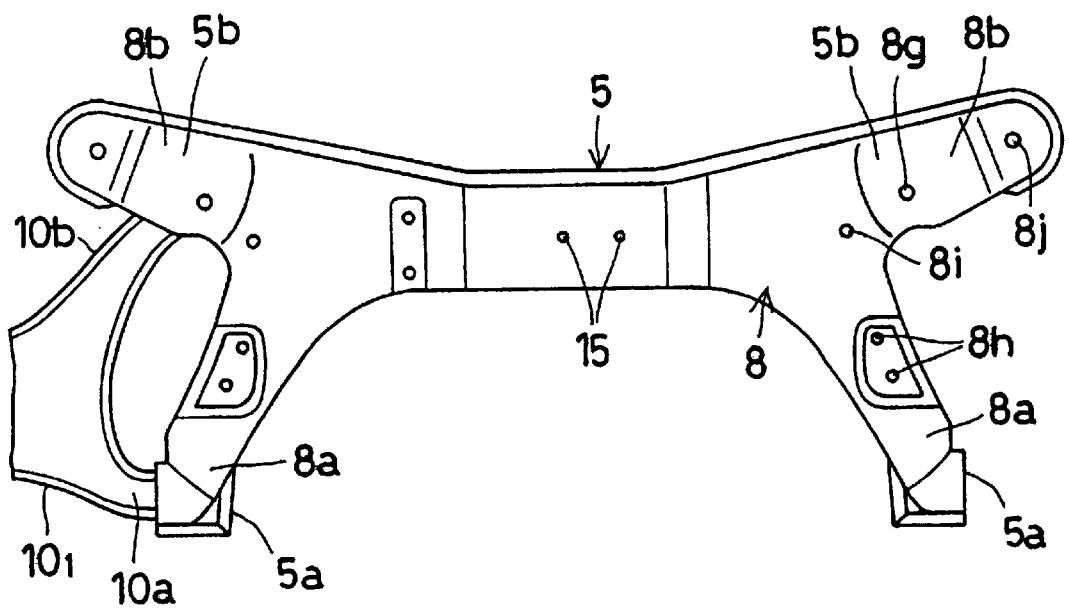
FIG. 3 is a plan view of the suspension frame construction shown in FIG. 2.
Figure 4:
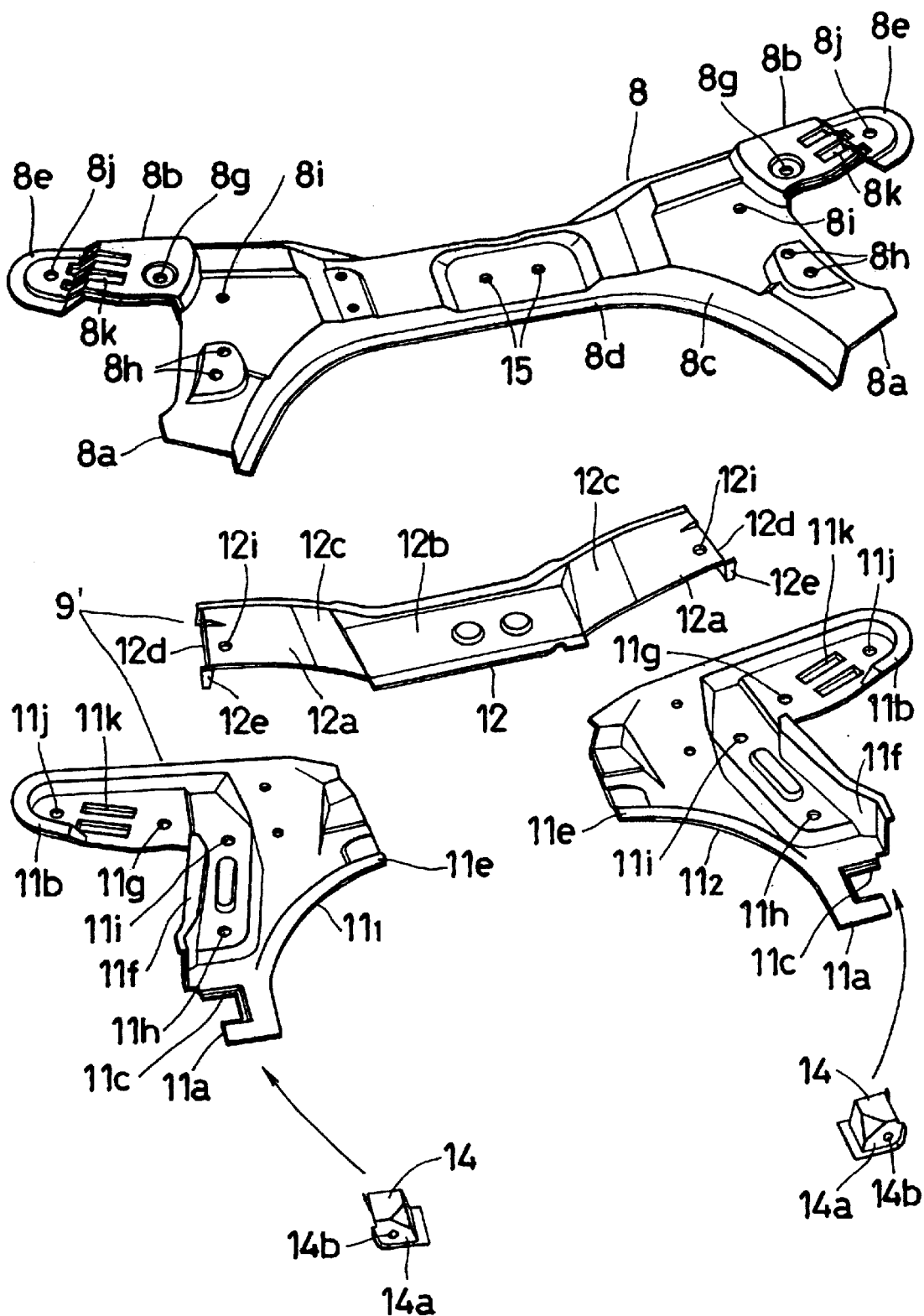
FIG. 4 is an exploded perspective view of the suspension frame construction shown in FIG. 2.

For the upper plate 8, as shown in FIGS. 2 to 4, the front and rear end portions of a flat steel plate are bent and extend downward, and suspension lower arm support portions 8a and 8b for supporting arms 10a and 10b of suspension lower arms $10_1$ and $10_2$ are provided on both sides, right and left, of the upper plate 8 so as to branch and extend to the substantially front and lateral sides.

The upper plate 8 is provided with a falling portion 8c that extends downward ranging from the face on the vehicle body front side to the inside face of the suspension lower arm support portion 8a. Along the lower edge of the falling portion 8c is provided a flange portion 8d.

Also, a flange portion 8e is provided along the lower end of the face on the vehicle body rear side from the peripheral portion of the suspension lower arm support portion 8b.

Figure 5:
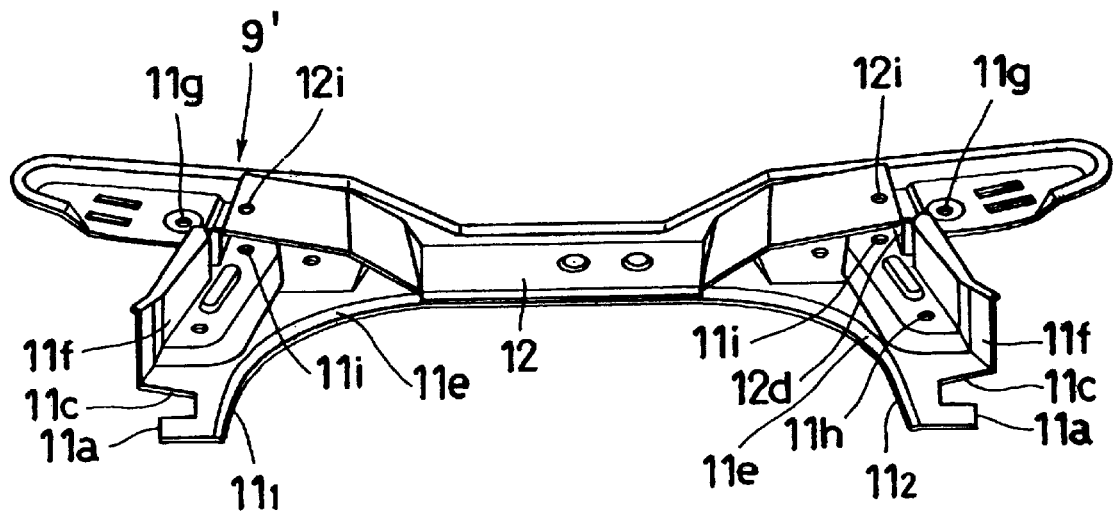
FIG. 5 is a perspective view of a lower plate shown in FIG. 2.

On the other hand, as shown in FIGS. 4 and 5, the lower plate 9' is formed into a three-piece construction composed of a pair of side plates $11_1$ and $11_2$ and a center plate 12 disposed between these side plates $11_1$ and $11_2$. The paired side plates $11_1$ and $11_2$ and the center plate 12 are joined to each other into a unit. The side plates $11_1$ and $11_2$ and the center plate 12 each are formed by pressing a steel plate, and the thicknesses of the side plates $11_1$ and $11_2$ are greater than thickness of the center plate 12. For the center plate 12, a band-shaped plate thinner than the conventional lower plate is used.

The paired side plates $11_1$ and $11_2$ each are provided, on the right and left sides thereof, with suspension lower arm support portions 11a and 11b for supporting the arms 10a and 10b of the suspension lower arm $10_1$ and $10_2$, like the upper plate 8, in such a manner as to branch and extend to the substantially front and lateral sides. The suspension lower arm support portions 11a provided on the paired side plates $11_1$ and $11_2$ are fitted with right and left lower arm mounting brackets $14_1$ and $14_2$, respectively. The lower arm mounting brackets $14_1$ and $14_2$ support the arms 10a and 10b of the suspension lower arms $10_1$ and $10_2$, respectively, so as to be swayable. The suspension lower arm support portion 11a is provided with a notch 11c for permitting the arms 10a and 10b of the suspension lower arms $10_1$ and $10_2$ to be swayed. Also, a flange portion 11d is provided at the front edge on the vehicle body front side of the side plate $11_1$, $11_2$. Also, a flange portion 11e is provided ranging from the suspension lower arm support portion 11b to the rear end on the vehicle body rear side.

On the outside face of the suspension frame 5 ranging from the suspension lower arm support portion 11a to the proximal end portion of the lateral suspension lower arm support portion 11b, a side wall portion 11f is erected on the outside of the side plate $11_1$, $11_2$. The side wall portion 11f is formed by bending the outer edge portion of the side plate $11_1$, $11_2$ upward substantially at right angles.

Figure 6:
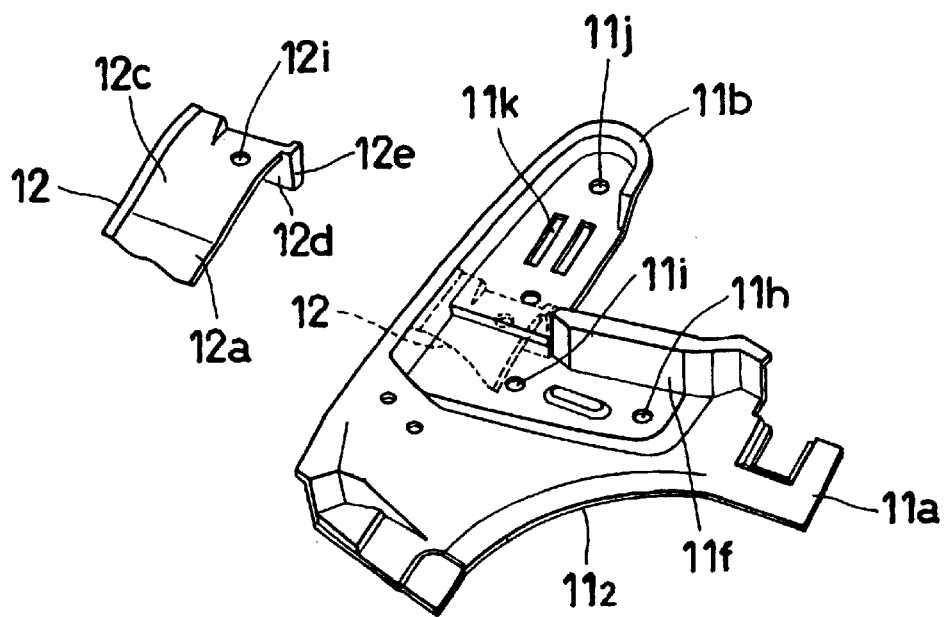
FIG. 6 is a perspective view of an assembling portion of a center plate and a side plate.

As shown in FIGS. 4 to 6, the center plate 12 has a slant face portions 12c that are each formed by bending a side 12a of the plate slantwise upward with respect to an intermediate portion 12b. A vertical wall portion 12d is formed by bending the end portion of the slant face portion 12c downward substantially at right angles. The vertical wall portion 12d of the center plate 12 is provided with a flange portion 12e at the periphery thereof, and the center plate 12 is connected to the side plate $11_1$, $11_2$ via this flange portion 12e.

The center plate 12 is assembled to the side plates $11_1$ and $11_2$ so that the vertical wall portions 12d on both sides each are continuous substantially straight with the side wall portions 11f of the side plates $11_1$ and $11_2$. The center plate 12 is formed integrally with the side plates $11_1$ and $11_2$ by welding (w1) the lower ends of the vertical wall portions 12d to the upper faces of the side plates $11_1$ and $11_2$ by arc welding and by welding (w2) both edges of the intermediate portion 12b to the upper faces of the side plates $11_1$ and $11_2$ by arc welding. Between the slant face portion 12c of the center plate 12 and the upper face of the side plate $11_1$, $11_2$ is formed a gap 13, so that a closed cross section $S_1$ is formed.

At both ends, right and left, of the suspension frame 5, suspension lower arm support portions 5a and 5b are formed by joining the upper plate 8 and the lower plate 9' to each other.

The suspension lower arm support portion 5a is formed by supporting the lower arm mounting bracket $14_1$, $14_2$ by the suspension lower arm support portion 8a of the upper plate 8 and the suspension lower arm support portion 11a of the side plate $11_1$, $11_2$.

The lower arm mounting bracket $14_1$, $14_2$ is formed substantially into a box shape by pressing or other means, and one side of this box shape is opened so as to form a support portion for a sway shaft of the suspension lower arm 10. In each of front and rear wall faces 14a opposed in the vehicle body longitudinal direction of this box shape, there is provided a mounting hole 14b for mounting the sway shaft of the suspension lower arm 10.

The suspension lower arm support portion 5b is formed by the suspension lower arm support portion 8b of the upper plate 8 and the suspension lower arm support portion 11b of the lower plate 9'.

Figure 7:
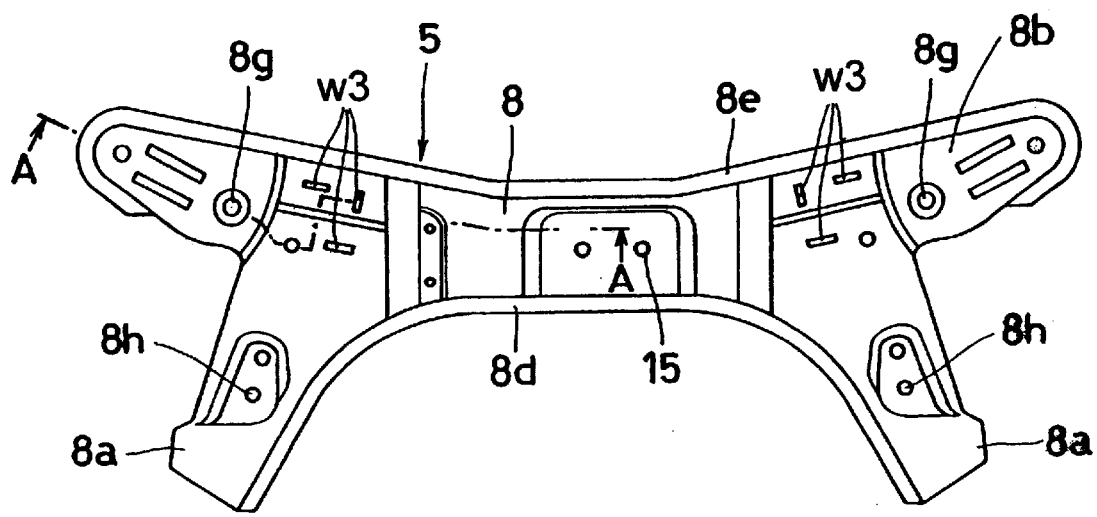
FIG. 7 is a plan view of a suspension frame, showing a joint portion of a center plate.
Figure 8:
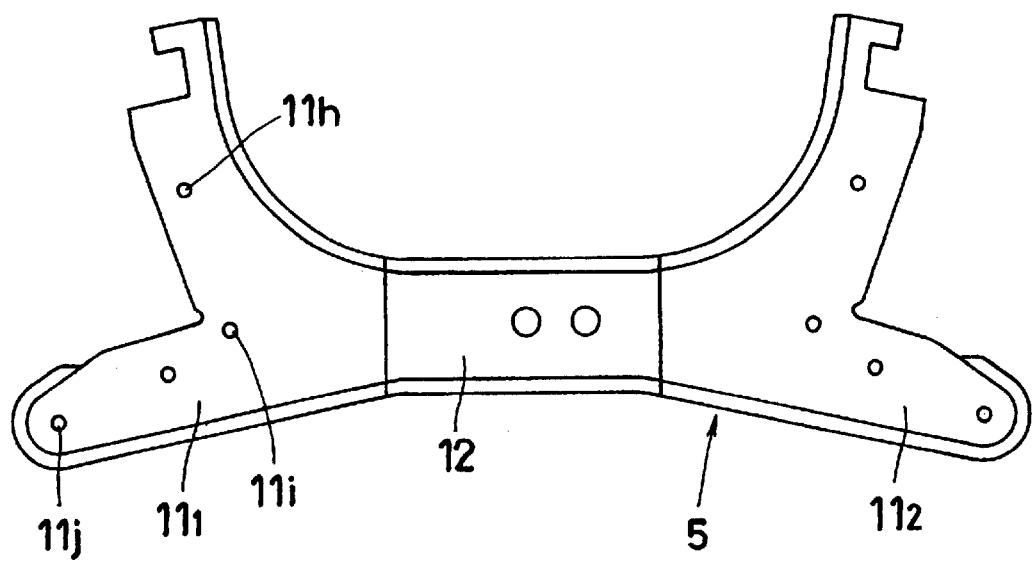
FIG. 8 is a bottom plan view of FIG. 7.
Figure 9:
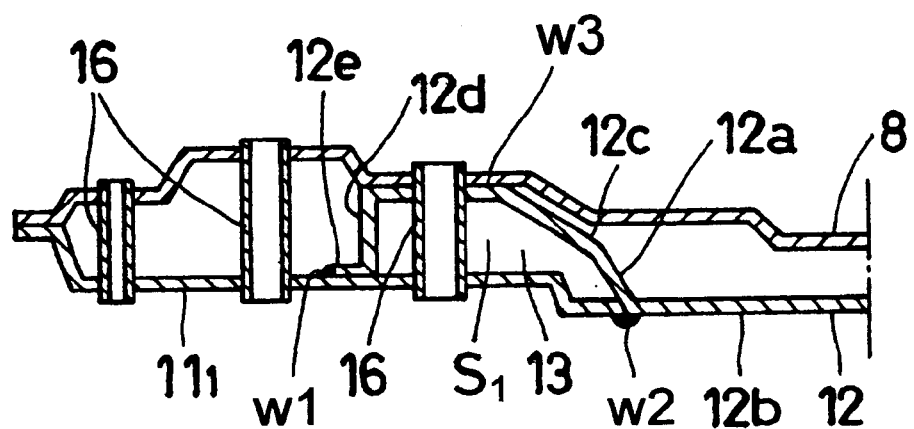
FIG. 9 is a sectional view taken along the line A—A of FIG. 7.

On the other hand, as shown in FIG. 4, in a substantially central portion of the suspension frame 5 are provided an engine mounting member mounting portions 15. Also, the upper plate 8 and the side plate $11_1$, $11_2$ of the lower plate 9' are provided with vehicle body mounting portions 8h, 8i and 8j and 11h, 11i and 11j of the suspension frame 5, respectively. The center plate 12 is provided with a mounting hole 12i corresponding to the vehicle body mounting portions 8i and 11i. As shown in FIG. 9, collars 16 are fitted in and welded to the vehicle body mounting holes 8h, 8i and 8j and 11h, 11i and 11j. In the portion where the center plate 12 is provided, the mounting hole 12i is also connected by the common collar 16. In the portion where the central plate 12 is provided, the upper plate 8 and the center plate 12 are joined to each other by penetration welding w3 as shown in FIGS. 7 and 9.

The joining of the center plate 12 to the side plates $11_1$ and $11_2$ and the joining of the center plate 12 to the upper plate 8 can be performed by various joining methods such as arc welding and spot welding.

Figure 10:
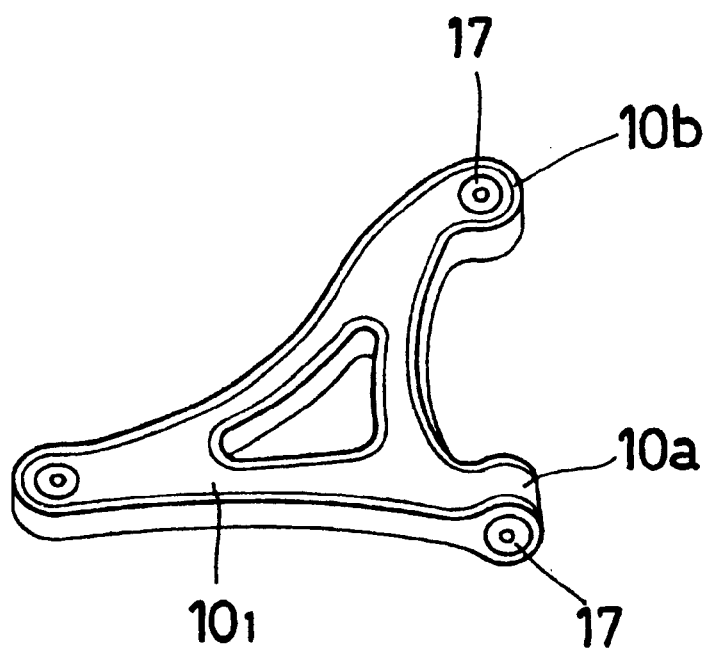
FIG. 10 is a perspective view of a suspension lower arm shown in FIG. 1.

Further, in the suspension lower arm support portion 8b of the upper plate 8 and the suspension lower arm support portion 11b of the lower plate 9', there are provided mounting holes 8g and 11g, respectively, for supporting the rear-side arm 10b of the suspension lower arm $10_1$, $10_2$ as shown in FIG. 10 (see FIG. 4). As shown in FIG. 10, the front-side arm 10a of the suspension lower arm $10_1$, $10_2$ is supported by a horizontal shaft, and the rear-side arm 10b thereof is supported by a vertical shaft. The front-side arm 10a and the rear-side arm 10b each are provided with a bush 17, and the suspension lower arm $10_1$, $10_2$ is supported on the suspension frame 5 so as to be swayed freely by inserting the support shaft in the center of the bush 17.

As shown in FIG. 4, the suspension lower arm support portion 5b of the suspension frame 5 is provided with an increased rigidity by ribs 8k and 11k formed in the vehicle width direction in the suspension lower arm support portion 8b of the upper plate 8 and the suspension lower arm support portion 11b of the lower plate 9', respectively. Further, the suspension lower arm support portion 8b of the upper plate 8 is formed a step higher so that the distance between the suspension lower arm support portion 8b of the upper plate 8 and the suspension lower arm support portion 11b of the lower plate 9' is increased, by which a support portion for the arm 10b of the suspension lower arm $10_1$, $10_2$ is formed.

According to the above-described construction, the lower plate 9' is formed into a three-piece construction composed of the paired side plates $11_1$ and $11_2$ and the center plate 12 disposed between these side plates $11_1$ and $11_2$, and the paired side plates $11_1$ and $11_2$ and the center plate 12 are joined to each other into a unit. The center plate 12 is thinner and therefore has a lower mass than the conventional lower plate, so that lighter weight of the suspension frame 5 can be achieved. On the other hand, the thicknesses of the side plates $11_1$ and $11_2$ are made greater than the thickness of the center plate 12 to increase the rigidity of the vehicle body mounting portions. By making the thicknesses of the side plates $11_1$ and $11_2$ greater, the natural frequency of the suspension frame 5 is increased, and thereby what is called a muffled sound is restrained.

The center plate 12 is formed integrally with the side plates $11_1$ and $11_2$ by welding (w1) the lower ends of the vertical wall portions 12d to the upper faces of the side plates $11_1$ and $11_2$ by arc welding and by welding (w2) both edges of the intermediate portion 12b to the upper faces of the side plates $11_1$ and $11_2$ by arc welding. Thus, between the slant face portion 12c of the center plate 12 and the upper face of the side plate $11_1$, $11_2$ is formed the gap 13, so that the closed cross section $S_1$ is formed. Therefore, the closed curved surface of the suspension frame 5 can be reinforced by the vertical wall portion 12d, so that an increase in rigidity can be achieved when a braking force, a lateral force, or an engine mounting load is applied to the suspension frame 5. Also, since the vehicle body mounting portions are formed by joining two plates of the side plate $11_1$, $11_2$ and the center plate 12, and the mounting portions are provided on the side of the side plate $11_1$, $11_2$ having a higher rigidity, the surface rigidity is increased, so that an increase in rigidity of vehicle body mounting portions can be achieved.

Further, the suspension lower arm support portion 5b of the suspension frame 5 is formed with the ribs 8k and 11k in the vehicle width direction in the suspension lower arm support portion 8b of the upper plate 8 and the suspension lower arm support portion 11b of the lower plate 9' to increase the rigidity. Further, the suspension lower arm support portion 8b of the upper plate 8 is formed a step higher so that the distance between the suspension lower arm support portion 8b of the upper plate 8 and the suspension lower arm support portion 11b of the lower plate 9' is increased, by which the support portion for the arm 10b of the suspension lower arm $10_1$, $10_2$ is formed. Thus, the distance between the upper plate 8 and the lower plate 9' can be increased only in the mounting portion for the arm 10b of the suspension lower arm $10_1$, $10_2$, so that the rigidity of the suspension frame 5 is not decreased. Since the arm 10b of the suspension lower arm $10_1$, $10_2$ is supported between the upper plate 8 and the lower plate 9', the rigidity can be increased. In particular, since the suspension lower arm support portion 8b and the suspension lower arm support portion 11b are joined to each other on the front and rear end sides and are joined by the vertical wall portion 12d of the center plate 12 at the proximal end side, only a pull-out portion for the arm 10b of the suspension lower arm $10_1$, $10_2$ is open, so that the support portion for the arm 10b can be constructed strongly.

Figure 11:
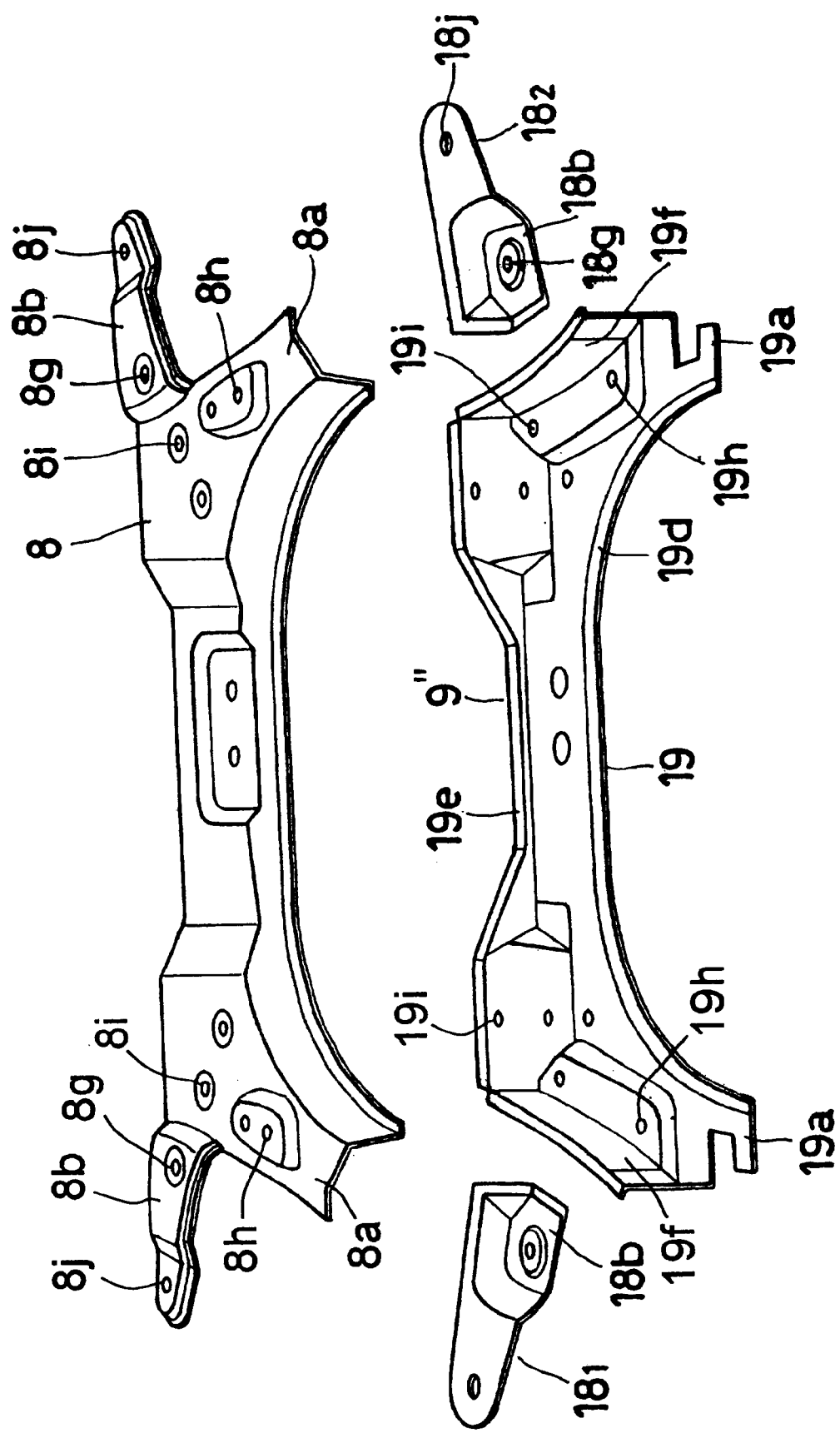
FIG. 11 is a schematic perspective view showing another embodiment of the suspension frame construction in accordance with the present invention shown in FIG. 1.
Figure 12:
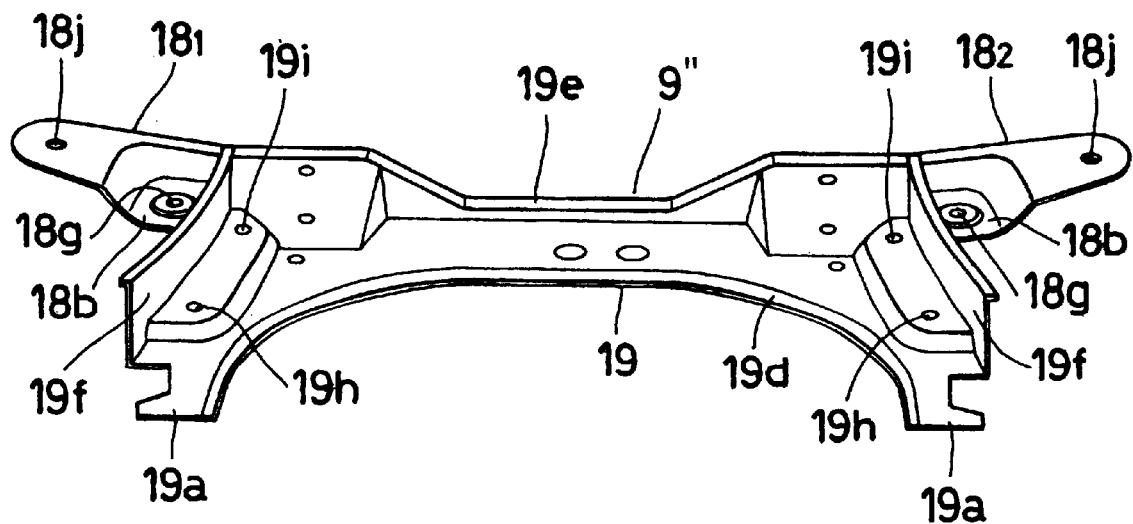
FIG. 12 is a perspective view of a lower plate in a state in which a center plate and side plates shown in FIG. 11 are connected to each other.
Figure 13:
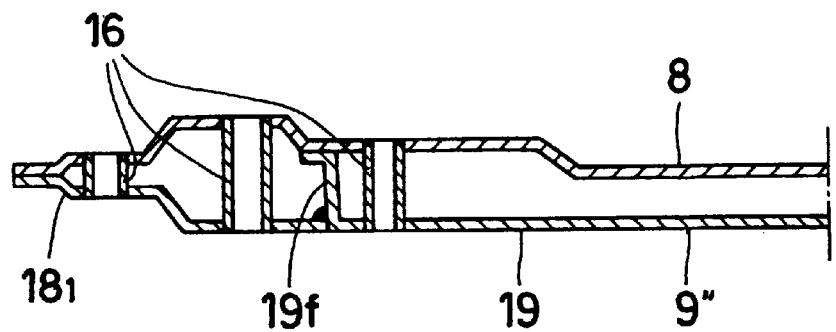
FIG. 13 is a sectional view showing a state in which the suspension frame shown in FIG. 13 is assembled.

FIGS. 11 to 13 show another embodiment of the present invention. In this embodiment, explanation is made by applying the same reference numerals to the same elements as those shown in FIGS. 1 to 4.

In this case, of the upper plate 8 and the lower plate 9', which constitute the suspension frame 5, the lower plate 9' is subjected to a change in construction.

A lower plate 9" has a construction such that only the right and left suspension lower arm support portions for supporting the rear-side arm 10b of the suspension lower arm $10_1$, $10_2$ are separated from the intermediate portion.

The lower plate 9" is composed of side plates $18_1$ and $18_2$ consisting of a suspension lower arm support portion 18b and a center plate 19 connected to the side plates $18_1$ and $18_2$. The center plate 19 is provided with suspension lower arm support portions 19a at the front ends on both sides.

The center plate 19 is provided with side wall portions 19f in the vehicle body longitudinal direction at both sides. The side wall portion 19f is provided so as to range from the vicinity of the suspension lower arm support portion 19a to the rear end, so that it partitions the internal space of the suspension frame 5 into the center plate side and the suspension lower arm support portion side.

The side plate $18_1$, $18_2$ is joined to the outside lower end of the side wall portion 19f of the center plate 19 by arc welding or other means.

The lower plate 9" is joined integrally to the upper plate 8 by joining flange portions 19d and 19e provided on the front and the rear of center plate 19 and the upper end of the side wall portion 19f to the upper plate 8 and by joining the side plates $18_1$ and $18_2$ to the peripheral surfaces of the suspension lower arm support portions 8b via the peripheral edge portions of the side plates $18_1$ and $18_2$ by spot welding or other means.

In this case, as the vehicle body mounting portions, the upper plate 8 is formed with the vehicle body mounting holes 8h, 8i and 8j, and the lower plate 9" is formed with vehicle body mounting holes 19h, 19i and 18j. The vehicle body mounting holes 19h and 19i are formed in the center plate 19, and the vehicle body mounting hole 18j is formed in the side plate $18_1$, $18_2$.

In this embodiment, as in the case of the above described embodiment, the thicknesses of the side plates $18_1$ and $18_2$ are made greater than the thickness of the center plate 19, by which the rigidity of the suspension lower arm support portion 18b can be increased.

FIGS. 14 to 20 show still another embodiment of the present invention. In this embodiment, the upper plate has a separated construction.

Figure 14:
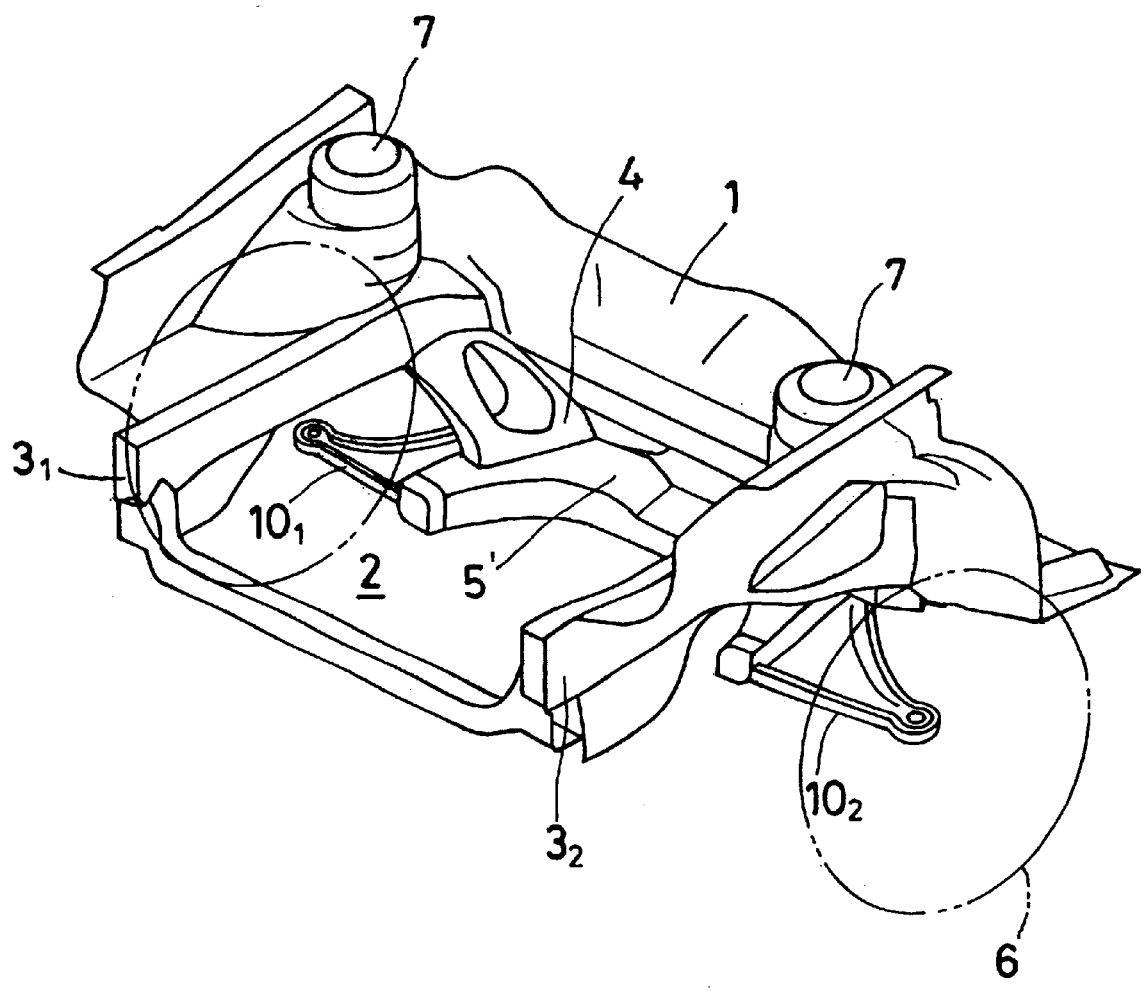
FIG. 14 is a schematic perspective view showing still another embodiment of a suspension frame construction in accordance with the present invention.
Figure 15:
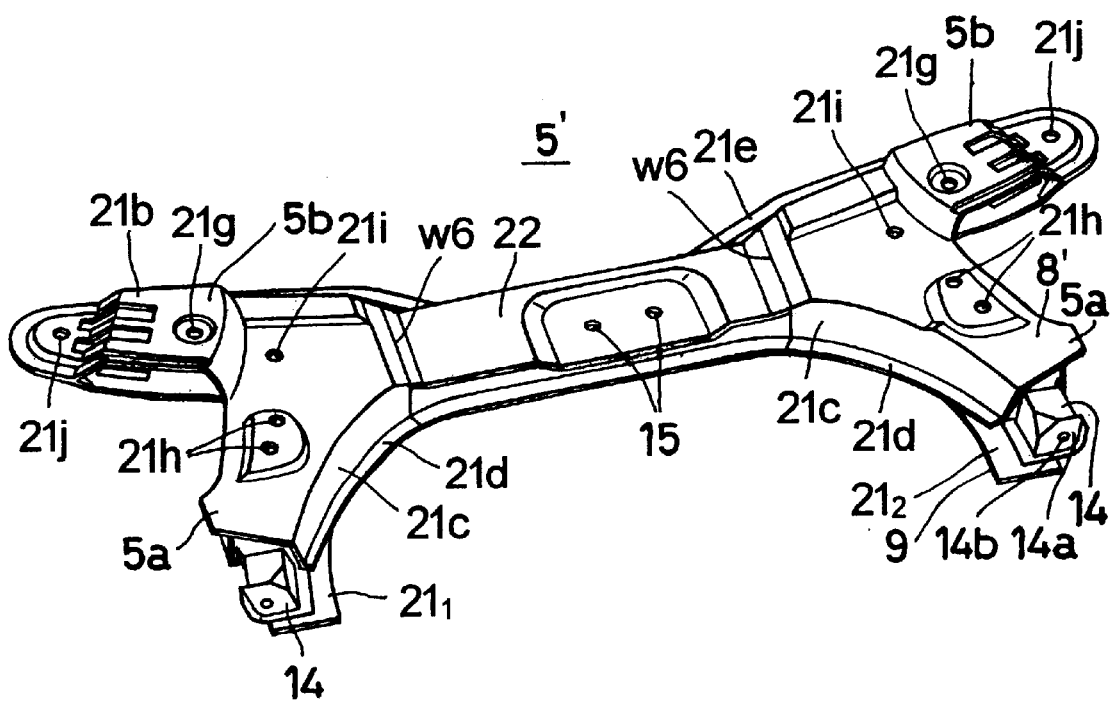
FIG. 15 is a perspective view of the suspension frame construction shown in FIG. 14.
Figure 16:
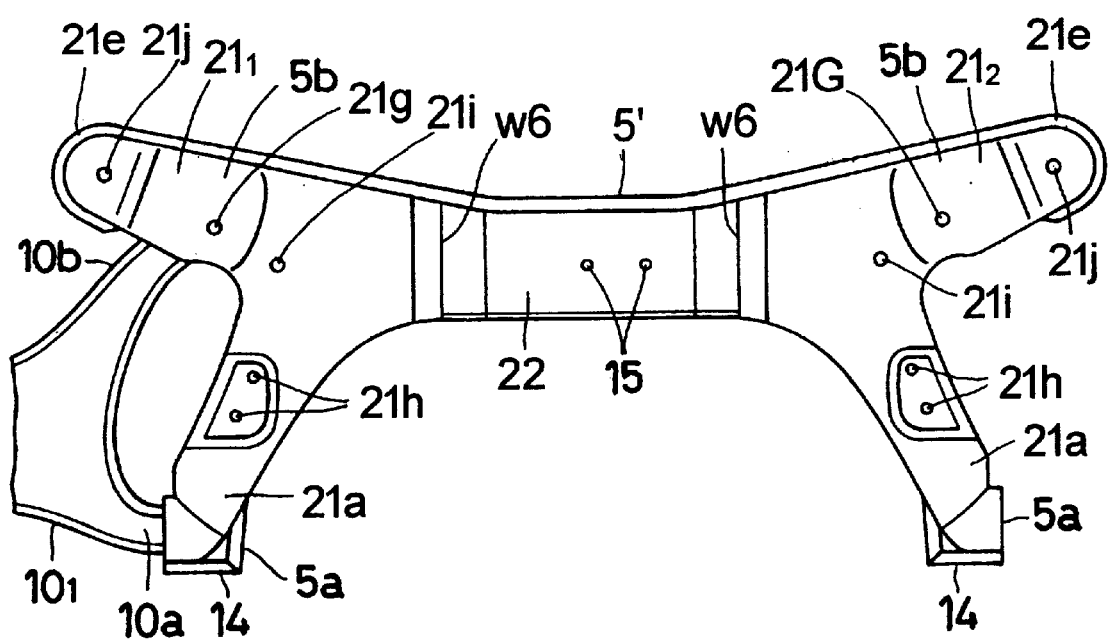
FIG. 16 is a plan view of the suspension frame construction shown in FIG. 15.

FIG. 14 shows the vehicle body front part of a motor vehicle. In this figure, the same reference numerals are applied to the same elements as those shown in FIG. 1.

In the engine room 2 isolated by the dash panel 1, a suspension frame 5' is installed to the front side members $3_1$ and $3_2$, which are disposed on both sides of the vehicle body, via the brackets 4 on the lower face side of the engine room 2. On the outside of the front side members $3_1$ and $3_2$ are provided the struts 7 for suspending the right and left wheels 6.

The construction of the suspension frame 5' will be described with reference to FIGS. 15 to 20.

As shown in FIGS. 15 to 18, the suspension frame 5' is formed into a substantially closed curved surface construction by joining an upper plate 8' and a lower plate 9, which are formed by pressing, to each other by welding or other means. On the right and left of the suspension frame 5', the suspension lower arm support portions 5a and 5b formed by the upper plate 8' and the lower plate 9 are provided so as to branch and extend to the substantially front and lateral sides.

The upper plate 8' has a three-piece construction composed of a pair of side plates $21_1$ and $21_2$ and a center plate 22 disposed between the side plates $21_1$ and $21_2$. The paired side plates $21_1$ and $21_2$ and the center plate 22 are joined to each other into a unit. The side plates $21_1$ and $21_2$ and the center plate 22 each are formed by pressing a steel plate.

Figure 17:
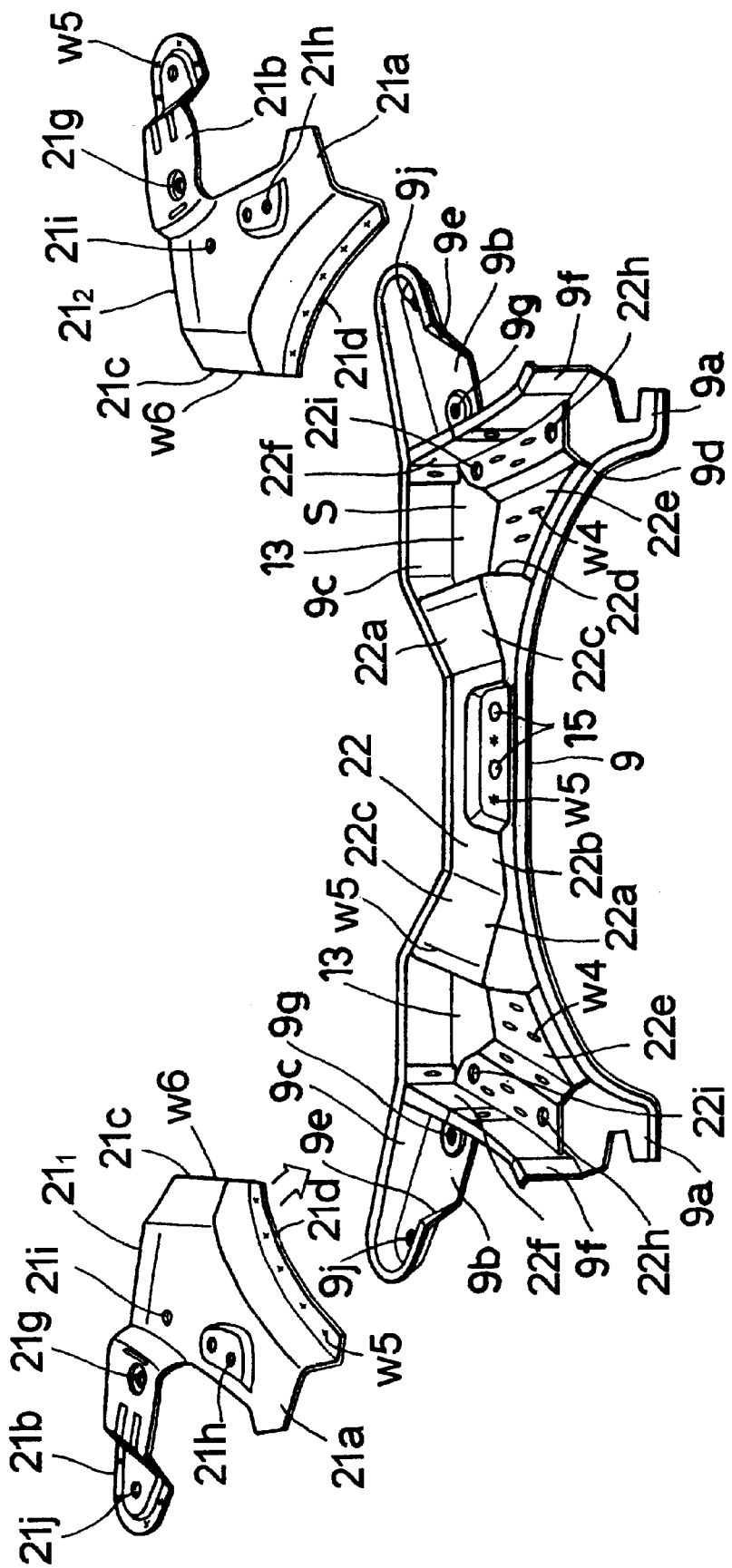
FIG. 17 is an exploded perspective view of the suspension frame construction shown in FIG. 15.
Figure 18:
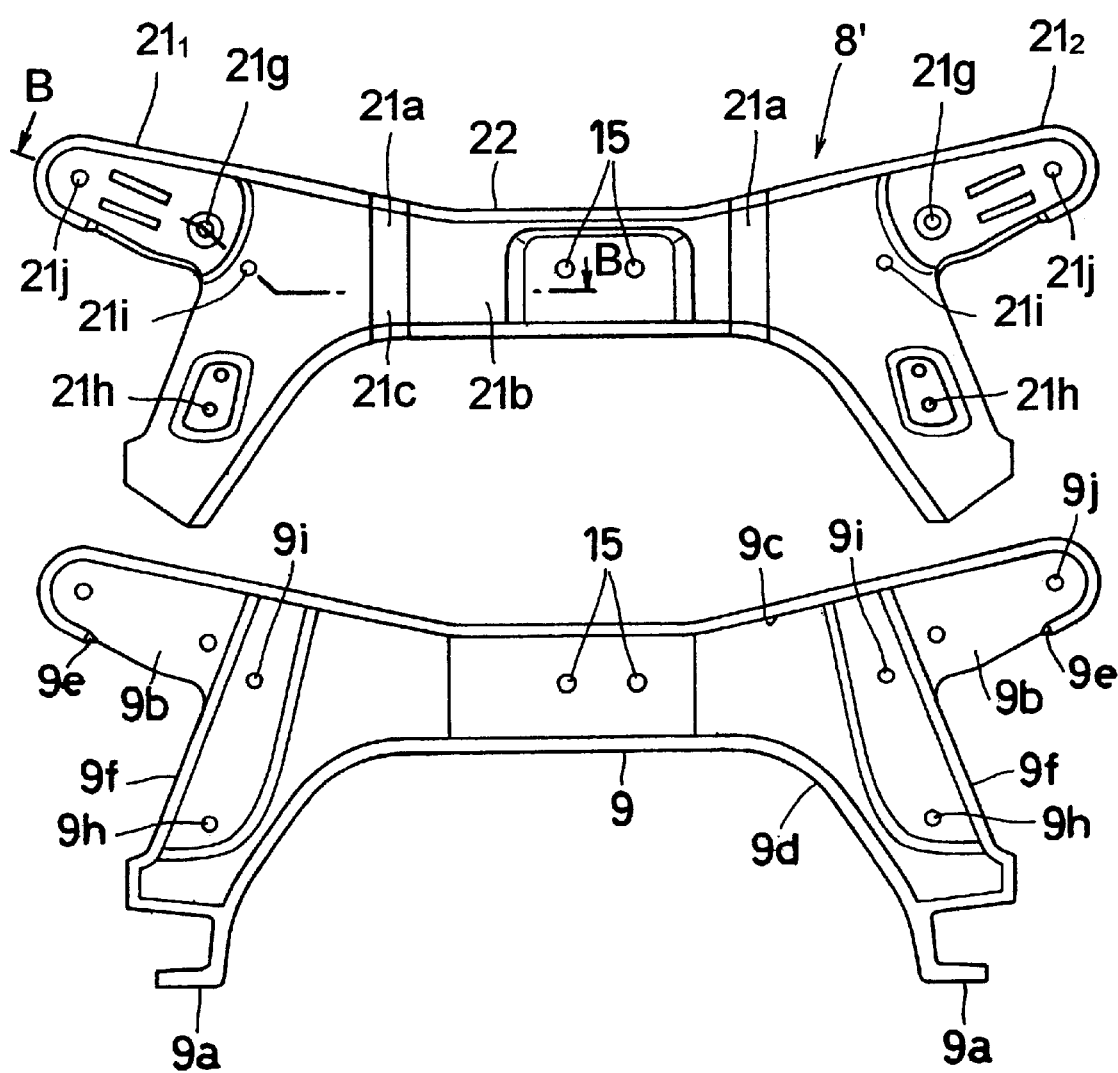
FIG. 18 is a plan view of an upper plate and a lower plate shown in FIG. 15.

On the other hand, as shown in FIGS. 17 and 18, for the lower plate 9, the rear end portion of a flat steel plate is bent and extend upward, and suspension lower arm support portions 9a and 9b for supporting the arms 10a and 10b of the suspension lower arms $10_1$ and $10_2$ are provided on both sides, right and left, of the lower plate 9 so as to branch and extend to the substantially front and lateral sides. The lower plate 9 is provided with a rising portion 9c at the peripheral edge thereof ranging from the rear end to the suspension lower arm support portion 9b, and is provided with a flange portion 9d at the front end peripheral edge thereof. In the rising portion 9c provided at the periphery of the suspension lower arm support portion 9b, a notch 9e for supporting the rear-side arm 10b of the suspension lower arm $10_1$, $10_2$ is provided on the front side.

Also, on the outside face of the lower plate 9 ranging from the front-side suspension lower arm support portion 9a to the proximal end portion of the lateral-side suspension lower arm support portion 9b, an outer wall portion 9f is erected along the outside edge of the lower plate 9.

As shown in FIG. 17, the center plate 22 has a slant face portions 22c that are each formed by bending a side 22a of the plate slantwise upward with respect to an intermediate portion 22b. A wall portion 22d is formed by bending the end portion of the slant face portion 22c downward substantially at right angles. To the wall portion 22d is connected a lapped portion 22e that is lapped on the upper face of the lower plate 9. At the side of the lapped portion 22e is erected a vertical wall portion 22f by bending the plate upward. The vertical wall portion 22f is provided so as to be continuous with the outer wall portion 9f of the lower plate 9 substantially straight in the vehicle body longitudinal direction. A flange portion at the upper end of the vertical wall portion 22f, together with a flange portion at the upper end of the outer wall portion 9f of the lower plate 9, is joined to the lower face of the side plate $21_1$, $21_2$. The lapped portion 22e of the center plate 22 is joined to the upper face of the lower plate 9 by penetration welding w4. Also, the front end of the vertical wall portion 22f is joined to the outer wall portion 9f, and the rear end thereof is joined to the rising portion 9c at the rear end of the lower plate 9.

The center plate 22 is assembled to the side plates $21_1$ and $21_2$ so that the vertical wall portions 22f on both sides are each continuous substantially straight with side wall portions 21f of the side plates $21_1$ and $21_2$. The center plate 22 is disposed on the upper face of the lower plate 9 so that the vertical wall portions 22f are each continuous substantially straight with the outer wall portions 9f of the lower plate 9, and the intermediate portion 22b thereof is joined to the lower plate 9 by spot welding w5 or other means.

The flange portion provided at the upper end of the vertical wall portion 22f, together with the flange portion provided at the upper end of the outer wall portion 9f of the lower plate 9, is joined to the lower face of the side plate $21_1$, $21_2$. The lapped portion 22e of the center plate 22 is joined to the upper face of the lower plate 9 by penetration welding w4.

Between the slant face portion 22c and the vertical wall portion 22f of the center plate 22 and the upper face of the side plate $21_1$, $21_2$ is formed a gap 23, so that a closed cross section $S_2$ is formed.

The paired side plates $21_1$ and $21_2$ each are provided, on the right and left sides thereof, with suspension lower arm support portions 21a and 21b for supporting the arms 10a and 10b of the suspension lower arm $10_1$ and $10_2$, like the upper plate 9, in such a manner as to branch and extend to the substantially front and lateral sides.

The side plate $21_1$, $21_2$ is assembled to the center plate 22 by joining an opposed inside edge portion 21c of the side plate $21_1$, $21_2$ to the upper end of the slant face portion 22c of the center plate 22 and by joining a front flange portion 21d of the side plate $21_1$, $21_2$ to the front flange portion 9d of the lower plate 9.

The suspension lower arm support portions 9a and the suspension lower arm support portions 21a provided on the paired side plates $21_1$ and $21_2$ are fitted with the right and left lower arm mounting brackets $14_1$ and $14_2$, respectively. The lower arm mounting brackets $14_1$ and $14_2$ support the arms 10a and 10b of the suspension lower arms $10_1$ and $10_2$, respectively, so as to be swayable.

The lower arm mounting bracket $14_1$, $14_2$ is formed substantially into a box shape by pressing or other means, and one side of this box shape is opened so as to form the support portion for the sway shaft of the arm 10a, 10b of the suspension lower arm $10_1$, $10_2$. In each of front and rear wall faces 14a opposed in the vehicle body longitudinal direction of this box shape, there is provided the mounting hole 14b for mounting the sway shaft of the suspension lower arm $10_1$, $10_2$.

On the other hand, in a substantially central portion of the suspension frame 5' are provided the engine mounting member mounting portions 15. Also, the side plate $21_1$, $21_2$ and the lower plate 9 are provided with vehicle body mounting holes 21h, 21i and 21j and 9h, 9i and 9j of the suspension frame 5', respectively, at the corresponding positions. The center plate 22 is provided with mounting holes 22i and 22h corresponding to the vehicle body mounting portions 21i, 21h, 9i, and 9h.

Further, in the suspension lower arm support portion 21b of the side plate $21_1$, $21_2$ and the suspension lower arm support portion 9b of the lower plate 9, there are provided mounting holes 21g and 9g, respectively, for supporting the rear-side arm 10b of the suspension lower arm $10_1$, $10_2$ (see FIG. 17).

Figure 19:
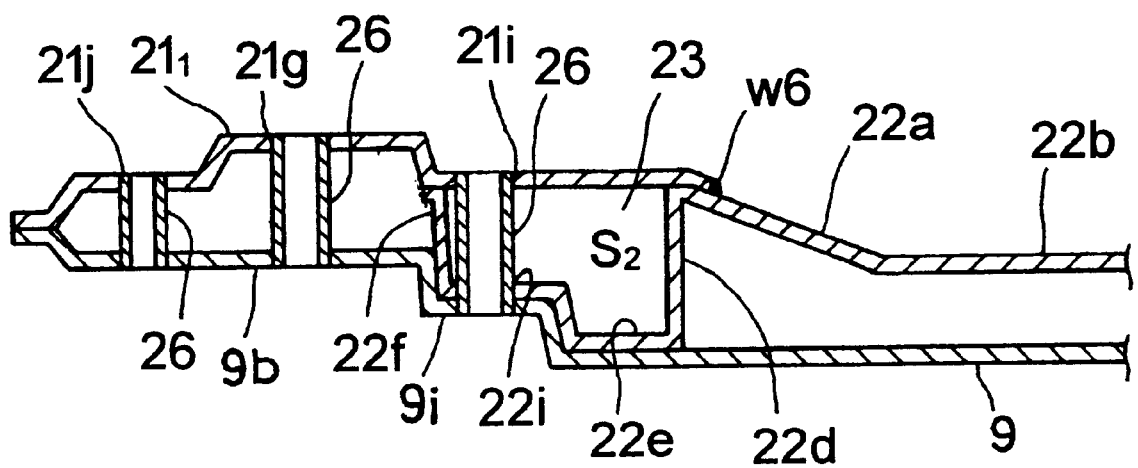
FIG. 19 is a sectional view taken along the line B—B of FIG. 18 in a state in which an upper plate and a lower plate are assembled to each other.

As shown in FIG. 19, collars 26 are fitted in and welded to the vehicle body mounting holes 21h, 21i, 21j, 9h, 9i, 9j and 22h. Although not shown in the figure, in the portion where the center plate 22 is provided, the similar collar 26 can also be used in the mounting hole 22*i*. In the portion where the central plate 22 is provided, the lower plate 9 and the center plate 22 are joined to each other by penetration welding w4 as shown in FIG. 17.

Figure 20:
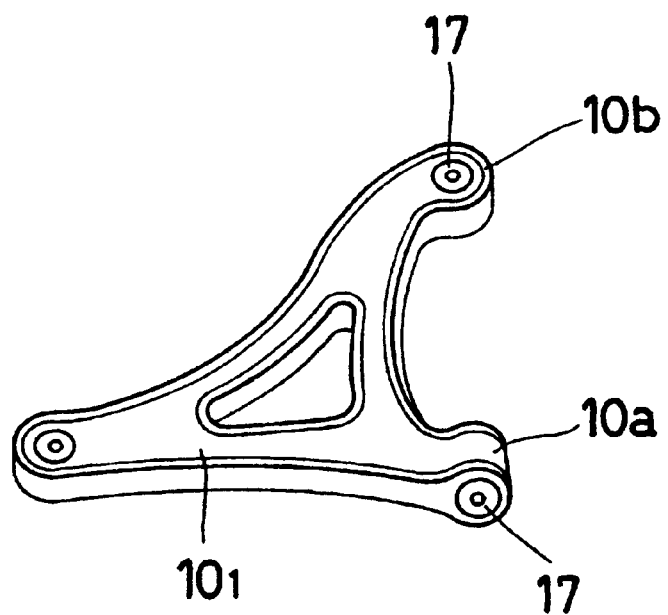
FIG. 20 is a perspective view of a suspension lower arm shown in FIG. 14.
Figure 21:
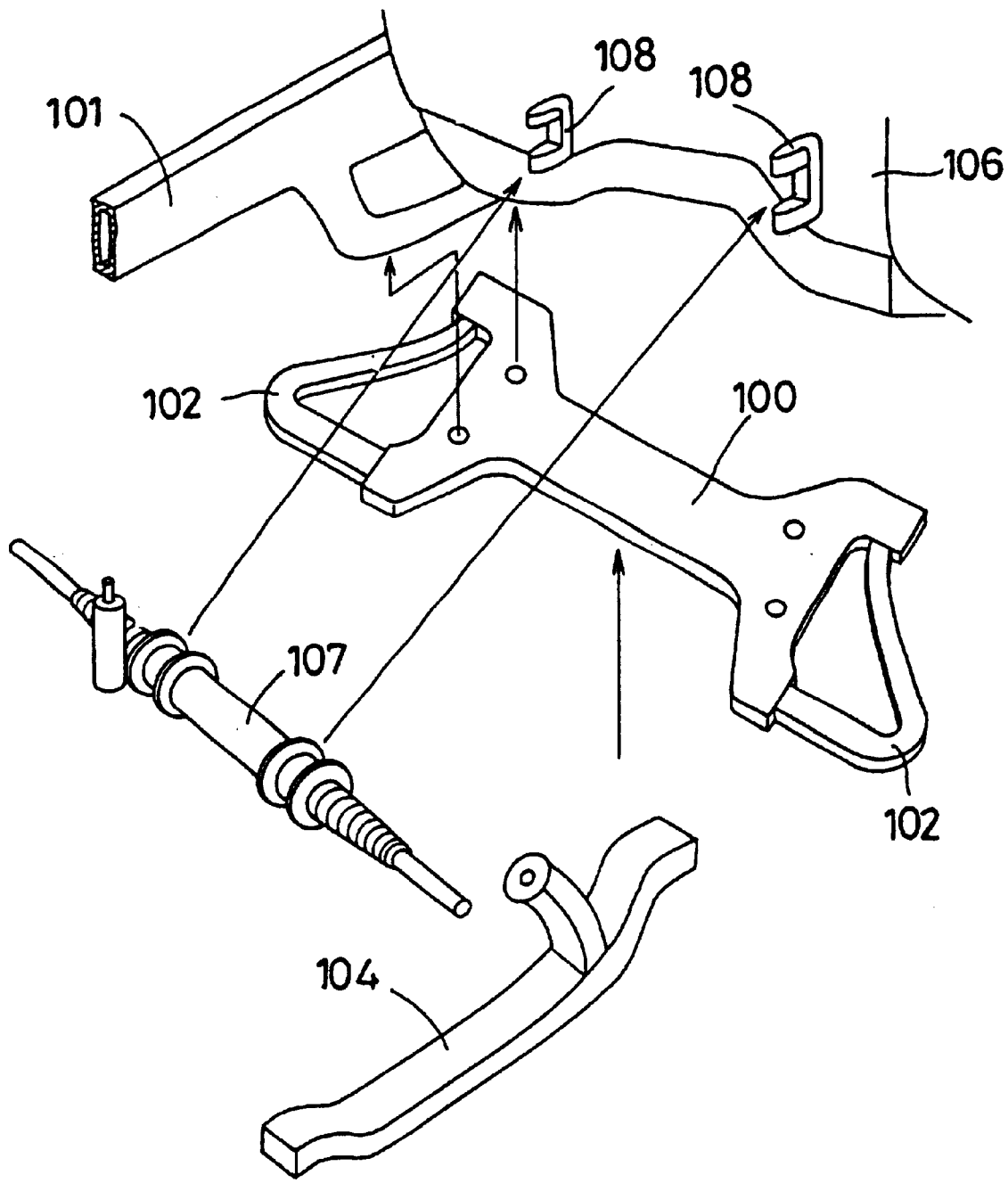
FIG. 21 is a perspective view of a conventional suspension frame construction.
Figure 22:
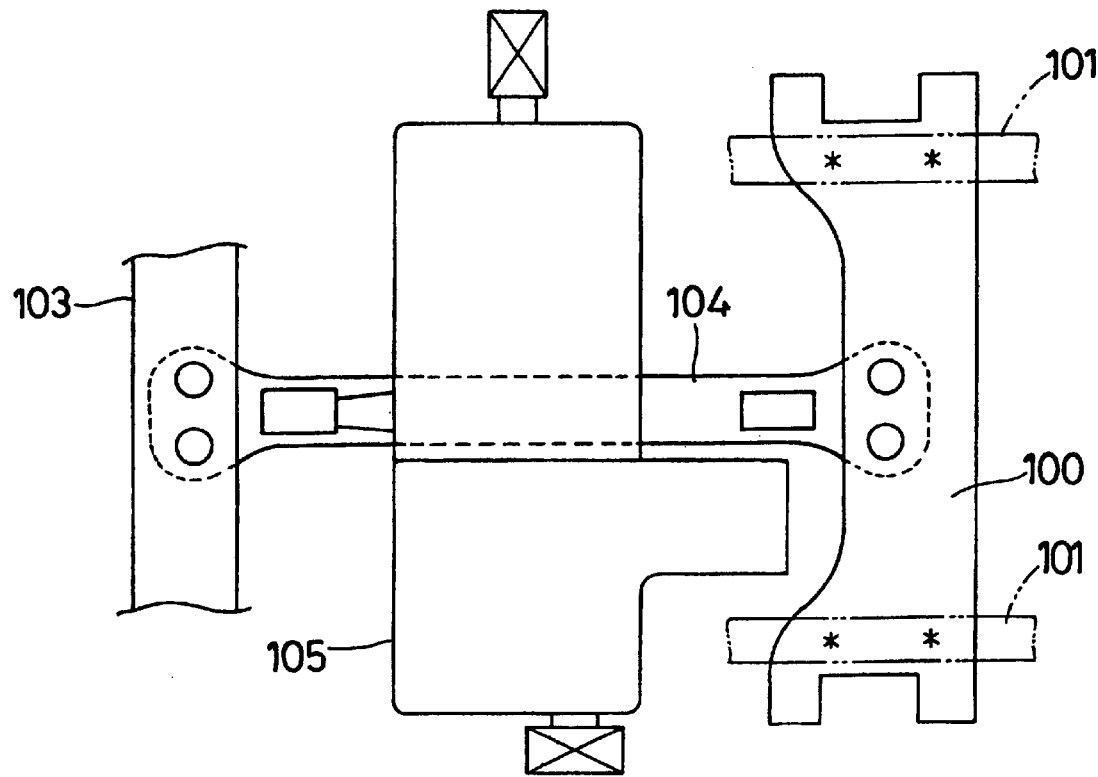
FIG. 22 is a plan view of a conventional suspension frame construction.
Figure 23:
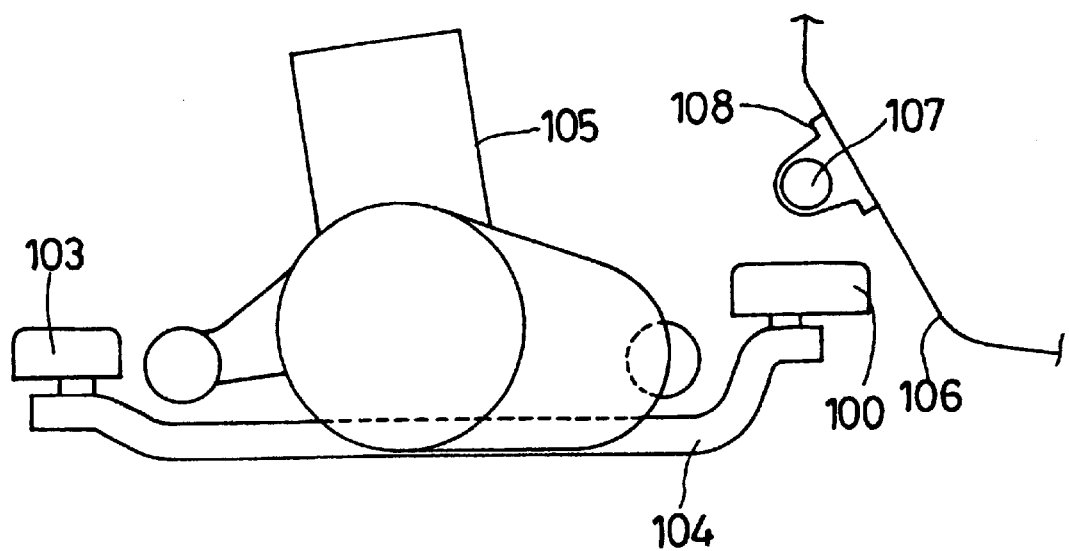
FIG. 23 is a side view of FIG. 22.
Figure 24:
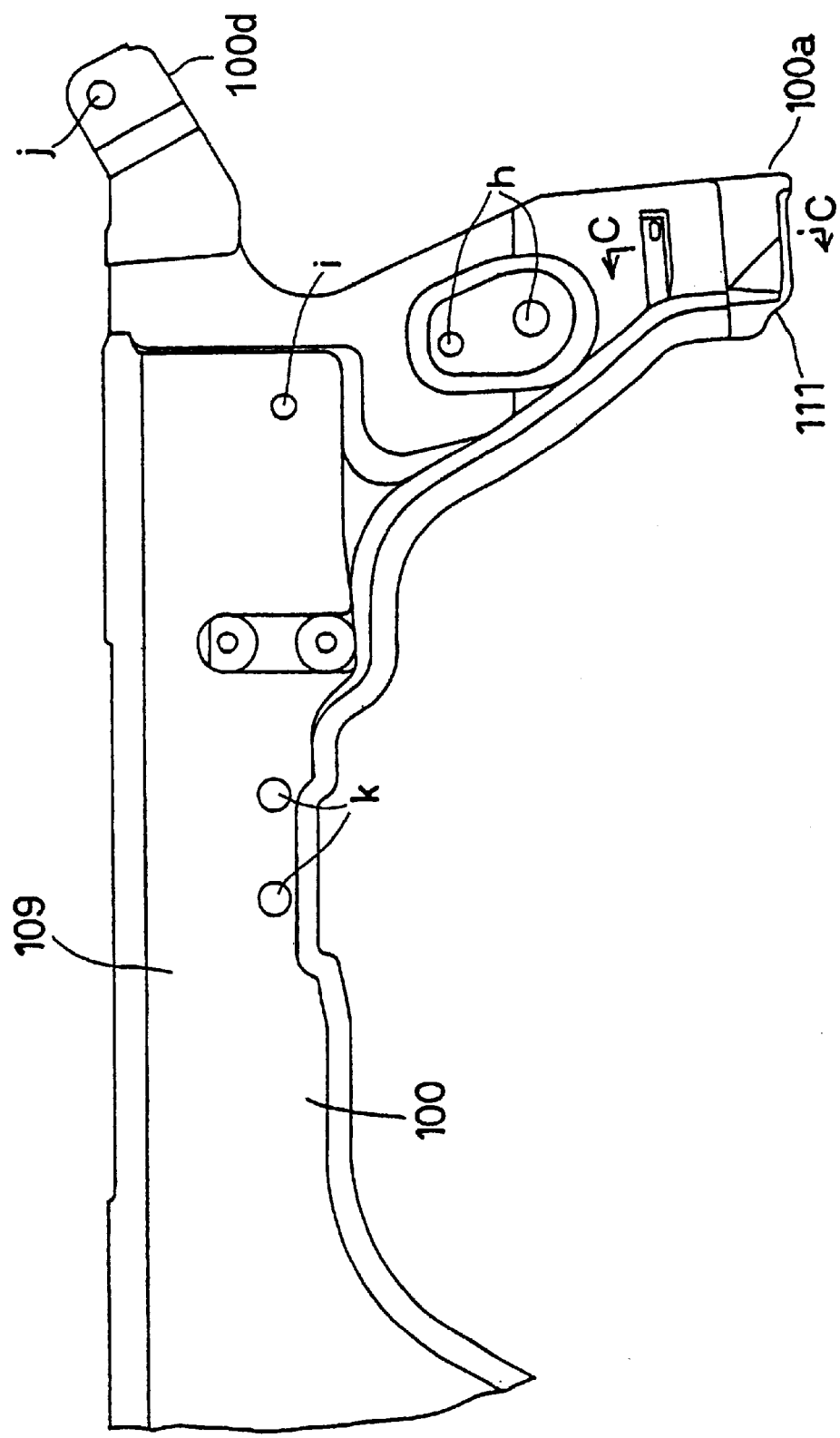
FIG. 24 is a plan view of a conventional suspension frame construction.
Figure 25:
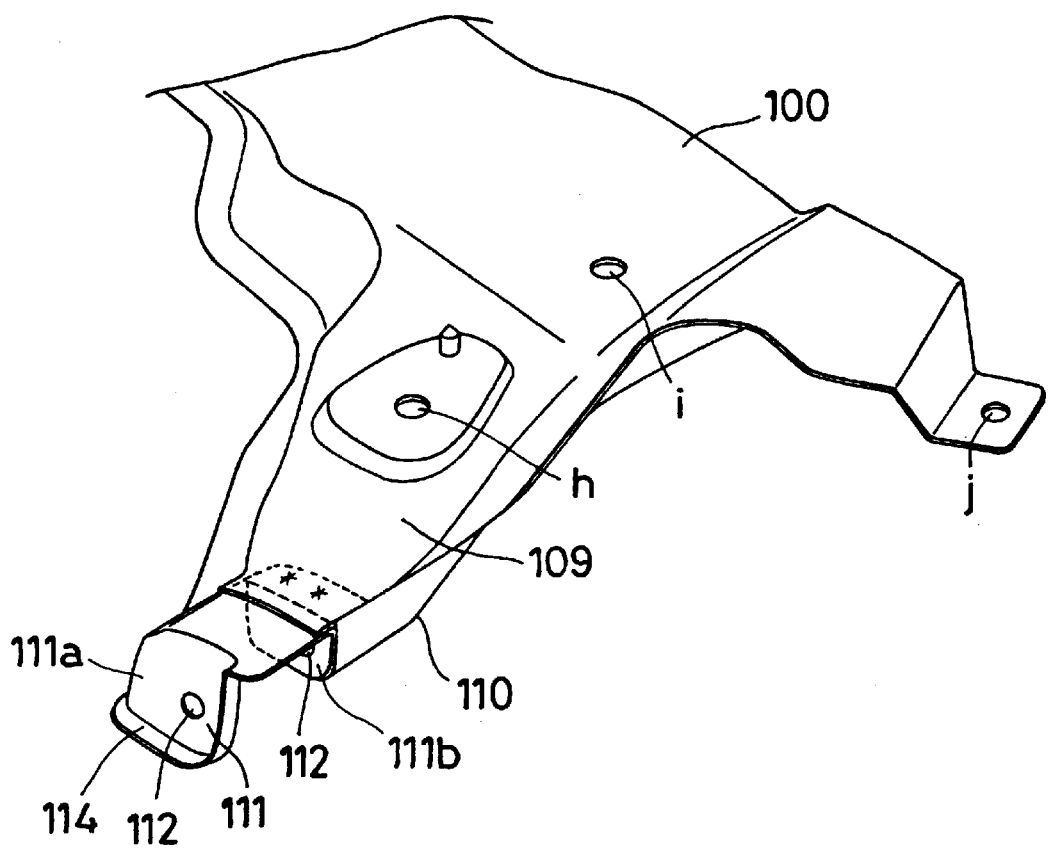
FIG. 25 is a perspective view of a conventional suspension frame construction.
Figure 26:
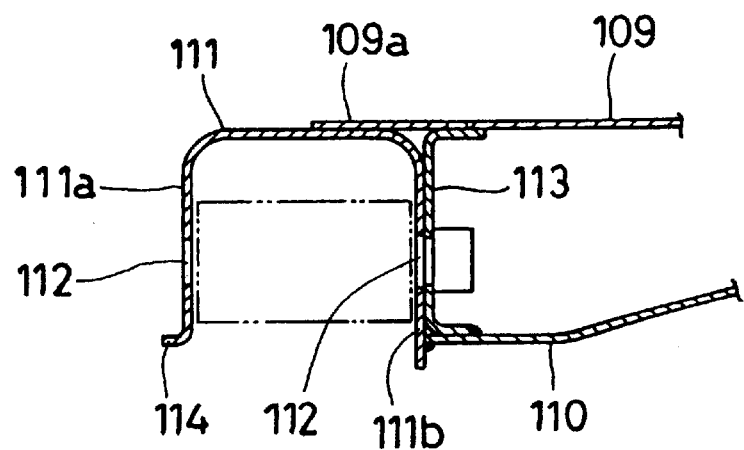
FIG. 26 is a sectional view taken along the line C—C of FIG. 24.
Figure 27:
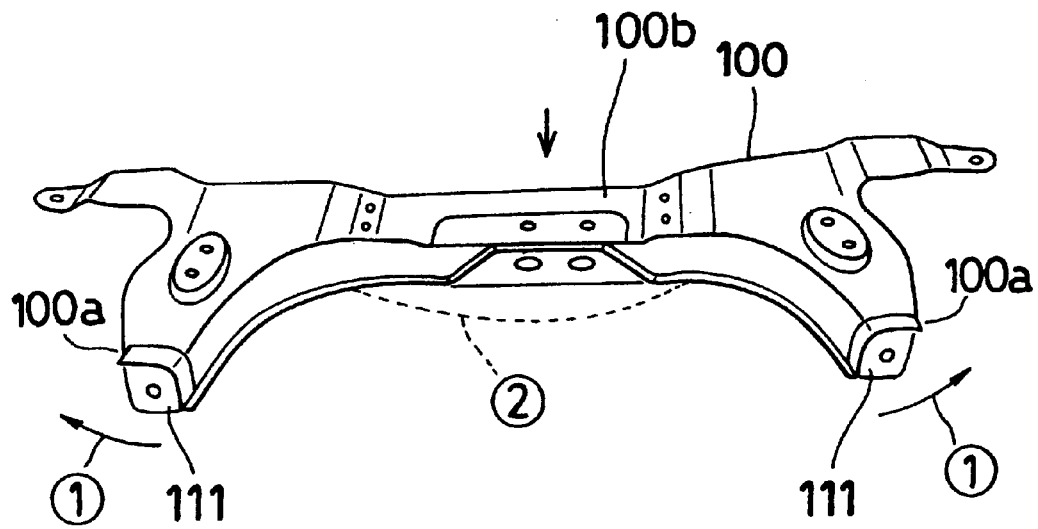
FIG. 27 is a perspective view showing a deformation mode of a conventional suspension frame construction under a braking load.
Figure 28:
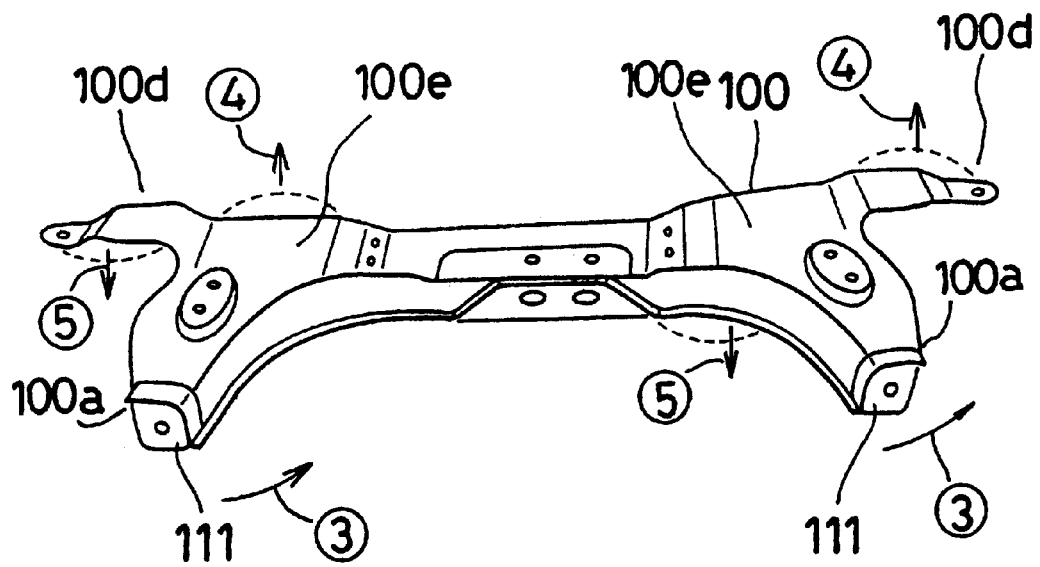
FIG. 28 is a perspective view showing a deformation mode of a conventional suspension frame construction under a lateral load.

The joining of the center plate 22 to the side plates $21_1$ and $21_2$ and the joining of the center plate 22 to the lower plate 9 can be performed by various joining methods such as arc welding and spot welding. As shown in FIG. 20, the front-side arm 10*a* of the suspension lower arm $10_1$, $10_2$ is supported by a horizontal shaft, and the rear-side arm 10*b* thereof is supported by a vertical shaft. The front-side arm 10*a* and the rear-side arm 10*b* each are provided with the bush 17, and the suspension lower arm $10_1$, $10_2$ is supported on the suspension frame 5' so as to be swayed freely by inserting the support shaft in the center of the bush 17.

Also, the suspension lower arm support portion 21*b* of the side plate $21_1$, $21_2$ is formed a step higher so that the distance between the suspension lower arm support portion 21*b* of the side plate $21_1$, $21_2$ and the suspension lower arm support portion 9*b* of the lower plate 9 is increased, by which the support portion for the arm 10*b* of the suspension lower arm $10_1$, $10_2$ is formed.

According to the above-described construction, the upper plate 8' is formed into a three-piece construction composed of the paired side plates $21_1$ and $21_2$ and the center plate 22 disposed between these side plates $21_1$ and $21_2$, and the lower plate 9 is joined to the center plate 22.

The center plate 22 is assembled to the side plates $21_1$ and $21_2$ so that the vertical wall portion 22*f* on both sides are each continuous substantially straight with the side wall portion 21*f* of the side plate $21_1$, $21_2$.

The center plate 22 is disposed on the upper face of the lower plate 9 so that the vertical wall portions 22*f* each are continuous straight with the outer wall portion 9*f* of the lower plate 9, and the intermediate portion 22*b* thereof is joined to the lower plate 9 by spot welding w5 or other means. The lapped portions 22*e* of the center plate 22 are joined to the upper face of the lower plate 9 by penetration welding w4. The side plates $21_1$ and $21_2$ are disposed on the lower plate 9 and the center plate 22, and the opposed inside edge portions 21*c* of the side plates $21_1$ and $21_2$ are each joined to the upper end of the slant face portion 22*c* of the center plate 22 by arc welding w6 or other means, and the front flange portions 21*d* of the side plates $21_1$ and $21_2$ are each joined to the front flange portion 9*d* of the lower plate 9 by spot welding w5 or other means.

Further, the flange portion at the upper end of the vertical wall portion 22*f* of the center plate 22 and the flange portion at the upper end of the outer wall portion 9*f* of the lower plate 9 are joined to the lower face of the side plate $21_1$, $21_2$.

According to the above-described construction, the center plate 22 can be made thinner and therefore can have a lower mass than the conventional upper plate, so that lighter weight of the suspension frame 5' can be achieved. On the other hand, the thicknesses of the side plates $21_1$ and $21_2$ can be made greater than the thickness of the center plate 22 to increase the rigidity of the vehicle body mounting portions. By making the thicknesses of the side plates $21_1$ and $21_2$ greater, the natural frequency of the suspension frame 5', is increased, and thereby what is called a muffled sound can be restrained.

Since the lapped portion 22*e* of the center plate 22 is joined to the upper face of the lower plate 9 by penetration welding w4, the lower plate 9 has a two-layer construction in this portion, and the closed cross-sectional construction is formed between the lower plate 9 and the side plate $21_1$, $21_2$. In particular, therefore, the rigidity of the vehicle body mounting portions increases, so that an increase in rigidity can be achieved when a braking force, a lateral force, or an engine mounting load is applied to the suspension frame 5'.

Also, the suspension lower arm support portion 21*b* of the upper plate 8' is formed a step higher so that the distance between the suspension lower arm support portion 21*b* of the upper plate 8' and the suspension lower arm support portion 9*b* of the lower plate 9 is increased, by which the support portion for the arm 10*b* of the suspension lower arm $10_1$, $10_2$ is formed. Thus, the distance between the upper plate 8' and the lower plate 9 can be increased only in the mounting portion for the arm 10*b* of the suspension lower arm $10_1$, $10_2$, so that the rigidity of the suspension frame 5', is not decreased. Since the arm 10*b* of the suspension lower arm $10_1$, $10_2$ is supported between the upper plate 8' and the lower plate 9, the rigidity can be increased. In particular, since the suspension lower arm support portion 21*b* and the suspension lower arm support portion 9*b* are joined to each other on the front and rear end sides and are joined by the vertical wall portion 22*f* of the center plate 22 at the proximal end side, only a pull-out portion for the arm 10*b* of the suspension lower arm $10_1$, $10_2$ is open, so that the support portion for the arm 10*b* can be constructed strongly.

The present invention is not limited to the above-described embodiments. For example, although the lower plate 9' is divided into three pieces, the paired side plates 111 and 112 and the center plate 12, in the present invention, the lower plate 9' can be divided into four or more pieces. Also, although the lower plate 9'' is divided into three pieces, the side plates $18_1$ and $18_2$, which each consist of the suspension lower arm support portion 18*b*, and the center plate 19, in another embodiment, the lower plate 9'' may be divided into five pieces by separating the suspension lower arm support portions 19*a*.

Further, in the above-described embodiments, the vehicle body mounting portion is divided into the thick side plates $11_1$ and $11_2$ in which all vehicle body mounting portions are provided and the thin center plate 12, or into the side plates $18_1$ and $18_2$ in which some vehicle body mounting portions are provided and the center plate 19. However, any division mode may be adopted.

Also, although the upper plate 8' is divided into three pieces, the paired side plates $21_1$ and $21_2$ and the center plate 22, in still another embodiment, the upper plate 8' can be divided into four or more pieces. Also, the thicknesses of the side plates $21_1$ and $21_2$ constituting the upper plate 8' is made greater than the thickness of the center plate 22, by which the rigidity of the side plates $21_1$, $21_2$ in which the vehicle body mounting portions are provided can be increased. In this case, by using a band-shaped plate that is thinner than the conventional upper plate as the center plate 22 constituting the upper plate 8', the total weight can be decreased.

Further, a blank material tailored by forming materials with different thicknesses into one piece by laser welding is used as the center plate 22 constituting the upper plate 8', by which lighter weight can be achieved. In this case, it is a matter of course that a thin portion is used as the intermediate portion 22*b* of the center plate 22 constituting the upper plate 8'.

As described above, the suspension frame construction in accordance with the present invention can achieve the effects described below.

In claim 1, in a suspension frame construction comprising an upper plate and a lower plate joined to each other to form a suspension frame; and front- and rear-side suspension arm support portions provided at both ends, right and left, of the suspension frame, the lower plate is made up of a pair of side plates each provided with a support portion for supporting at least a rear-side arm of a suspension arm and a center plate for connecting the side plates to each other. Therefore, the rigidity can be increased when a braking force, a lateral force, or an engine mounting load is applied to the suspension frame. The increase in rigidity under the mounting load can eliminate a mass damper.

In claim 2, the thicknesses of the side plates are made greater than the thickness of the center plate, and a vehicle body mounting portion is provided on the side plate. Therefore, in a state in which the weight is kept low, the rigidity can be increased when a braking force, a lateral force, or an engine mounting load is applied to the suspension frame.

In claim 3, the suspension arm support portions are provided on the front and rear of the right and left side plates, and a side wall portion is formed on the outside of the side plate. Therefore, the rigidity can be increased when a braking force, a lateral force, or an engine mounting load is applied to the suspension frame.

In claim 4, bent portions are formed at both ends of the center plate to form a gap between the center plate and the right and left side plates, and the distal lower end of the bent portion is joined to the side plate to form a vertical wall portion for partitioning the interior of the suspension frame. Therefore, the rigidity of the suspension frame can be increased when a braking force, a lateral force, or an engine mounting load is applied to the suspension frame.

In claim 5, the vertical wall portion is arranged in a substantially straight line with respect to the side wall portion. Therefore, the rigidity of the suspension frame can be increased when a braking force, a lateral force, or an engine mounting load is applied to the suspension frame.

In claim 6, the side wall portion provided on the side plate is formed so as to be close to the vehicle body mounting portion of the suspension frame. Therefore, the rigidity of the vehicle body mounting portion can be increased.

In claim 7, both end portions of the center plate are lapped partially on the right and left side plates, the lapped portion is inclined toward the vertical wall portion, and a gap is formed in the lapped portion. Therefore, the rigidity of the suspension frame can be increased when a braking force, a lateral force, or an engine mounting load is applied to the suspension frame.

In claim 8, the inclined portion of the center plate is extended to at least the vehicle body mounting portion of the suspension frame. Therefore, the rigidity of the vehicle body mounting portion can be increased.

In claim 9, in a suspension frame construction comprising an upper plate and a lower plate joined to each other to form a suspension frame; and front- and rear-side suspension arm support portions provided at both ends, right and left, of the suspension frame, the upper plate is made up of a pair of side plates each provided with a support portion for supporting at least a rear-side arm of a suspension arm and a center plate for connecting the side plates to each other. Therefore, by adjusting the plate thickness, light weight can be achieved, and also the rigidity can be increased when a braking force, a lateral force, or an engine mounting load is applied to the suspension frame. The increase in rigidity under the mounting load can eliminate a mass damper.

In claim 10, in a suspension frame construction comprising an upper plate and a lower plate joined to each other to form a suspension frame; and suspension arm support portions extending to the substantially front and lateral sides, which are provided at both ends, right and left, of the suspension frame, the upper plate is made up of a pair of side plates each provided with a support portion for supporting at least a rear-side arm of a suspension arm and a center plate for connecting the side plates to each other, an outer wall portion is formed in the suspension arm support portion extending to the substantially front side, and a vertical wall portion continuous with the outer wall portion is provided on the center plate. Therefore, by adjusting the plate thickness, in a state in which the weight is kept low, the rigidity can be increased when a braking force, a lateral force, or an engine mounting load is applied to the suspension frame.

In claim 11, the center plate comprises inclined portions provided on the inside of the right and left vertical wall portions, an intermediate portion connected to the lower plate, which is provided between the inclined portions, and lapped portions joined face-to-face to the lower plate, which are each provided between the vertical wall portion and the inclined portion. Therefore, the lower plate is made have a two-layer construction, and the closed cross-sectional construction can be formed between the vertical wall portion and the inclined portion at the right and left, so that the rigidity and driving stability can be increased, and the rigidity can be increased when a braking force, a lateral force, or an engine mounting load is applied to the suspension frame. The natural frequency is increased, and thereby a muffled sound can be restrained.

In claim 12, the peripheral edge of the side plate is joined to the lower plate, and the lower face of the side plate is joined to the upper end of inclined portion and the upper end of vertical wall portion of the center plate. Therefore, the closed cross-sectional construction can be formed, so that the rigidity and driving stability can be increased, and the rigidity of the suspension frame can be increased when a braking force, a lateral force, or an engine mounting load is applied to the suspension frame.

In claim 13, the lapped portions of the center plate are joined to the lower plate by penetration welding. Therefore, the surface rigidity can be increased.

What is claimed is:

1. A suspension frame construction comprising an upper plate and a lower plate joined to each other to form a suspension frame; and front- and rear-side suspension arm support portions provided at both ends, right and left, of said suspension frame, wherein said lower plate comprises a pair of side plates each provided with a support portion for supporting at least a rear-side arm of a suspension arm and a center plate for connecting said slide plates to each other.

2. The suspension frame construction according to claim 1, wherein the thickness of said side plates are greater than the thickness of said center plate, and wherein said suspension frame construction further comprises a vehicle body mounting portion on said side plate.

3. The suspension frame construction according to claim 1, wherein said suspension arm support portions are on the front and rear of said right and left side plates, and wherein said suspension frame construction further comprises a side wall portion on the outside of said plate.

4. The suspension frame construction according to claim 1, wherein said center plate comprises bent portions at both ends thereof forming a gap between said center plate and said right and left side plates, and wherein the distal lower end of said bent portion is jointed to said side plate to form a vertical wall portion for partitioning the interior of said suspension frame.

5. The suspension frame construction according to claim 4, wherein said vertical wall portion forms a substantially straight line with respect to said side wall protion.

6. The suspension frame construction according to claim 3, wherein said side wall portion on said side plate is close to the vehicle body mounting portion of said suspension frame.

7. The suspension frame construction according to claim 4, wherein both end portions of said center plate are lapped partially on said right and left side plates, the lapped portion is inclined toward said vertical wall portion, and a gap is formed in said lapped portion.

8. The suspension frame construction according to claim 7, wherein the inclined portion of said center plate is extended to at least the vehicle body mounting portion of said suspension frame.

9. A suspension frame construction comprising an upper plate and a lower plate joined to each other to form a suspension frame; and front- and rear-side suspension arm support portions provided at both ends, right and left, or said suspension frame, wherein said upper plate comprises a pair of side plates each provided with a support portion for supporting at least a rear-side arm of a suspension arm and a center plate for connecting said side plates to each other.

10. A suspension frame construction comprising an upper plate and a lower plate joined to each other to form a suspensio frame; and suspension arm support portions extending substantially along front and lateral sides, which are provided at both ends, right and left, of said suspension frame, wherein said upper plate comprises a pair of side plates each provided with a support portion form supporting at least a rear-side arm of a suspension arem and a center plate for connecting said side plates to each oher, said suspension frame construction further comprising an outer wall portion formed in said suspension arm support portion and extending substantially along a front side thereof, and a vertical wall portion continuous with said outer wall portion on said center plate.

11. The suspension frame construction according to claim 10, wherein said center plate comprises inclined portions on the inside of said right and left vertical wall portions, an intermediate portion between said inclined portions and connected to said lower plate, and lapped portions joined face-to-face to said lower plate, which are each provided between said vertical wall portion and said inclined portion.

12. The suspension frame construction according to claim 11, wherein the peripheral edge of said side plate is joined to said lower plate, and the lower face of said side plate is joined to the upper end of inclined portion and the upper end of vertical wall portion of said center plate.

13. The suspension frame construction according to claim 11, wherein the lapped portions of said center plate are joined to said lower plate by penetration welding.

\* \* \* \* \*

UNITED STATES PATENT AND TRADEMARK OFFICE
CERTIFICATE OF CORRECTION

PATENT NO. : 6,409,216 B2
DATED : June 25, 2002
INVENTOR(S) : Suzuki

It is certified that error appears in the above-identified patent and that said Letters Patent is hereby corrected as shown below:

<u>Title page,</u>
Item [73], Assignee, "Shizuoka-ken" should read -- Hamamatsu --.

<u>Column 14,</u>
Line 50, "slide" should read -- side --;
Line 65, "jointed" should read -- joined --.

<u>Column 15,</u>
Line 3, "protion" should read -- portion --;
Line 20, "or" should read -- of --;
Line 27, "suspensio" should read -- suspension --.

<u>Column 16,</u>
Line 3, "form" should read -- for --;
Line 4, "arem" should read -- arm --.

Signed and Sealed this

Seventeenth Day of September, 2002

Attest:

JAMES E. ROGAN
Attesting Officer    Director of the United States Patent and Trademark Office